US010432722B2

(12) United States Patent
Jain et al.

(10) Patent No.: US 10,432,722 B2
(45) Date of Patent: Oct. 1, 2019

(54) CLOUD STORAGE PLATFORM PROVIDING PERFORMANCE-BASED SERVICE LEVEL AGREEMENTS

(71) Applicant: Microsoft Technology Licensing, LLC, Redmond, WA (US)

(72) Inventors: Navendu Jain, Seattle, WA (US); Luhui Hu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 589 days.

(21) Appl. No.: 15/148,923

(22) Filed: May 6, 2016

(65) Prior Publication Data
US 2017/0324813 A1 Nov. 9, 2017

(51) Int. Cl.
G06F 15/16 (2006.01)
H04L 29/08 (2006.01)
H04L 12/24 (2006.01)
G06F 9/455 (2018.01)
G06F 9/50 (2006.01)

(52) U.S. Cl.
CPC .......... H04L 67/1097 (2013.01); G06F 9/455 (2013.01); G06F 9/5016 (2013.01); G06F 9/5077 (2013.01); H04L 41/5009 (2013.01)

(58) Field of Classification Search
CPC ................................................... G06F 3/0631
USPC ....................................................... 709/229
See application file for complete search history.

(56) References Cited

U.S. PATENT DOCUMENTS 6,976,134 B1 * 12/2005 Lolayekar ............. G06F 3/0613
709/214

7,308,687 B2 12/2007 Trossman et al.
7,400,580 B1 7/2008 Synnestvedt et al.
7,991,893 B2 8/2011 Kudo
(Continued)

FOREIGN PATENT DOCUMENTS

EP 2560098 A1 * 2/2013 ........... G06F 3/0607
WO 2015094299 A1 6/2015

OTHER PUBLICATIONS

Kothari, et al., "Techniques for Reducing the Down Time during Virtual Machine Migration", In International Journal of Computer Science and Information Technologies, vol. 5, Issue 5, Oct. 2014, 5 pages.
(Continued)

Primary Examiner — Hamza N Algibhah
(74) Attorney, Agent, or Firm — Schwegman Lundberg & Woessner, P.A.

(57) ABSTRACT

A performance-based storage service level agreement (SLA) can be established that specifies one or more storage performance parameters. A storage allocation process can include receiving a request for a storage SLA that specifies one or more storage performance parameters, determining, for a virtual machine (VM) and based at least in part on the one or more storage performance parameters in the storage SLA: (i) a storage location among a set of candidate storage locations, and (ii) an amount of storage to allocate. The amount of storage can then be allocated at the storage location for the VM to use in making storage requests. Runtime enforcement of the storage SLA can utilize a scheduling mechanism that buffers individual storage requests into different queues that are used for meeting one or more storage performance requirements specified in storage SLA.

20 Claims, 8 Drawing Sheets

(56) References Cited

U.S. PATENT DOCUMENTS

| | | | |
|---|---|---|---|
| 8,396,807 | B1 | 3/2013 | Yemini et al. |
| 8,477,610 | B2 | 7/2013 | Zuo et al. |
| 8,578,106 | B1* | 11/2013 | Shapiro .................. G06F 3/061 |
| | | | 711/119 |
| 8,839,254 | B2 | 9/2014 | Horvitz et al. |
| 8,904,394 | B2 | 12/2014 | Dawson et al. |
| 9,274,817 | B1 | 3/2016 | Fan et al. |
| 9,936,003 | B1* | 4/2018 | Sarcar .................... H04L 67/10 |
| 2003/0079019 | A1* | 4/2003 | Lolayekar .......... H04L 67/1097 |
| | | | 709/226 |
| 2005/0076154 | A1 | 4/2005 | Chambliss et al. |
| 2007/0156955 | A1* | 7/2007 | Royer, Jr. ............. G06F 13/387 |
| | | | 711/113 |
| 2010/0057913 | A1* | 3/2010 | DeHaan ................ G06F 15/173 |
| | | | 709/226 |
| 2010/0058332 | A1* | 3/2010 | DeHaan .................... G06F 8/61 |
| | | | 717/177 |
| 2011/0252420 | A1* | 10/2011 | Tung ..................... G06F 9/5072 |
| | | | 718/1 |
| 2012/0022910 | A1 | 1/2012 | Chi et al. |
| 2012/0041899 | A1 | 2/2012 | Greene et al. |
| 2012/0254567 | A1* | 10/2012 | Umbehocker ........ G06F 3/0604 |
| | | | 711/162 |
| 2012/0330711 | A1 | 12/2012 | Jain et al. |
| 2013/0297921 | A1* | 11/2013 | Wright .................. G06F 9/4406 |
| | | | 713/2 |
| 2014/0007097 | A1 | 1/2014 | Chin et al. |
| 2014/0040891 | A1* | 2/2014 | Karve ................. G06F 9/45545 |
| | | | 718/1 |
| 2014/0130055 | A1* | 5/2014 | Guha ..................... G06F 3/0604 |
| | | | 718/104 |
| 2014/0136684 | A1 | 5/2014 | Jain et al. |
| 2014/0351808 | A1* | 11/2014 | Srinivasan .......... G06F 9/45545 |
| | | | 718/1 |
| 2014/0366155 | A1* | 12/2014 | Chang .................... G06F 21/10 |
| | | | 726/27 |
| 2015/0106343 | A1 | 4/2015 | Srinivasan et al. |
| 2015/0113118 | A1 | 4/2015 | Jain et al. |
| 2015/0143053 | A1* | 5/2015 | Quimbey ............ G06F 12/0855 |
| | | | 711/133 |
| 2017/0031600 | A1* | 2/2017 | Kesavan ................ G06F 3/0605 |
| 2017/0103223 | A1* | 4/2017 | Deulgaonkar .......... G06F 9/544 |

OTHER PUBLICATIONS

Kleyman, Bill, "Storage Virtualization, Hyperscale, and the Abstraction of Data", Published on: May 20, 2015 Available at: http://www.datacenterknowledge.com/archives/2015/05/20/storage-virtualization-hyperscale-abstraction-data/.

Kleyman, Bill, "Logical Abstraction of the Physical Data Center", Published on: Feb. 24, 2015 Available at: http://www.datacenterknowledge.com/archives/2015/02/24/logical-abstraction-of-the-physical-data-center/.

Jang, et al., "Silo: Predictable Message Latency in the Cloud", In Proceedings of the ACM Conference on Special Interest Group on Data Communication, Aug. 17, 2015, 14 pages.

Angel, et al., "End-to-end Performance Isolation through Virtual Datacenters", In Proceedings of the 11th USENIX conference on Operating Systems Design and Implementation, Oct. 6, 2014, 16 pages.

Thereska, et al., "IOFlow: A Software-Defined Storage Architecture", In Proceedings of the 24th ACM Symposium on Operating Systems Principles, Nov. 3, 2013, 15 pages.

Elmore, et al., "Characterizing Tenant Behavior for Placement and Crisis Mitigation in Multitenant DBMSs", In Proceedings of the ACM SIGMOD International Conference on Management of Data, Jun. 22, 2013, 12 pages.

Manning, Paul, "Dynamic Storage Provisioning Considerations and Best Practices for Using Virtual Disk Thin Provisioning", In White Paper of Vmware, Retrieved on: Dec. 22, 2015, 11 pages.

"International Search Report and Written Opinion Issued in PCT Application No. PCT/US2017/029738", dated Jul. 19, 2017, 11 Pages.

* cited by examiner

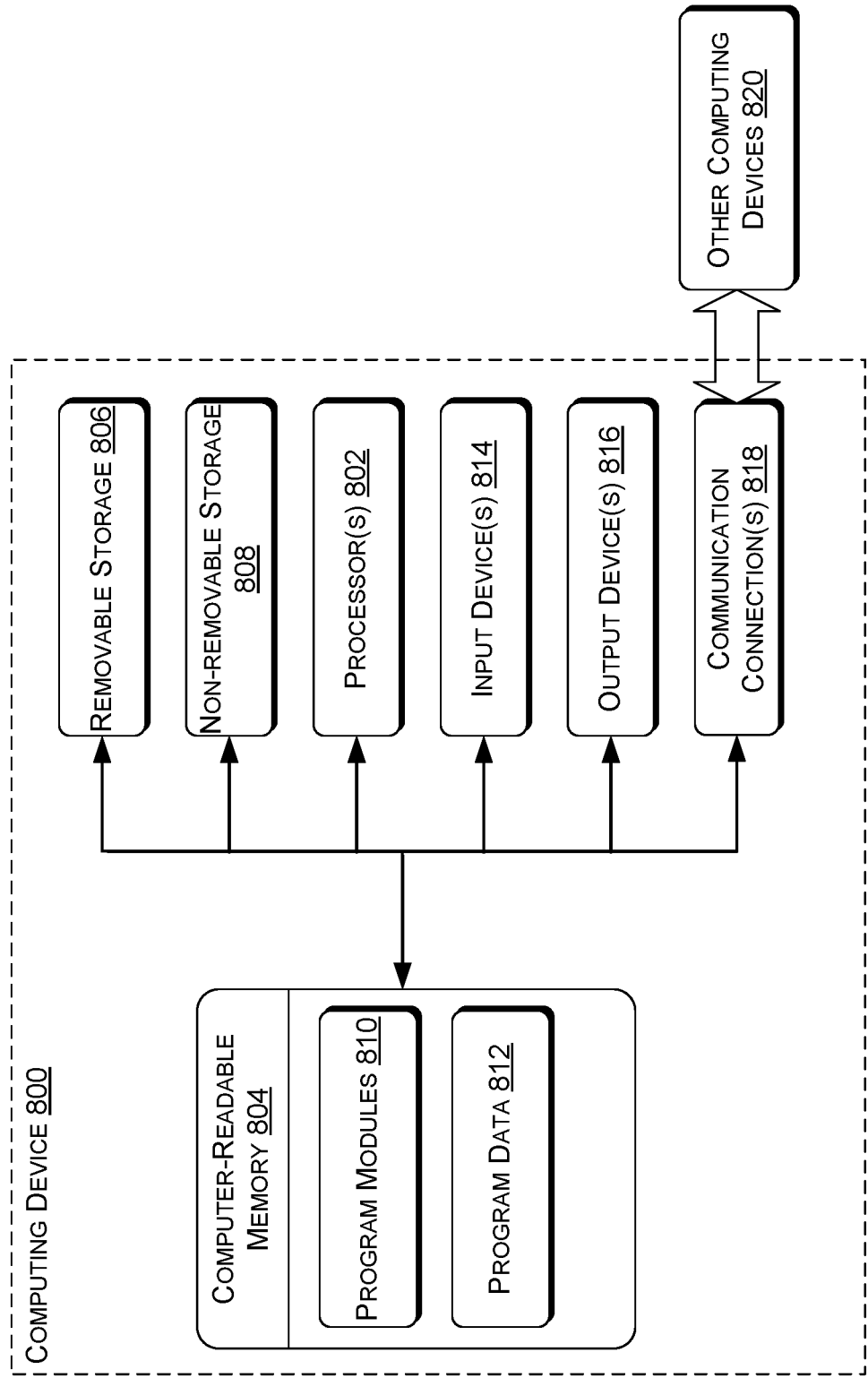

CLOUD STORAGE PLATFORM PROVIDING PERFORMANCE-BASED SERVICE LEVEL AGREEMENTS

BACKGROUND

In a cloud storage platform, a customer can generally request that storage be allocated for use by a computing instance (e.g., a virtual machine (VM)) so that the VM can make storage requests (e.g., read/write requests) to or from the allocated storage. In this scenario, the ability to allocate the requested storage is based on an assumption that the requested storage is available for allocation. While the cloud ideology advertises the availability of "infinite" resources that are available on-demand, in practice, storage capacity is large, but limited, and storage capacity cannot dynamically scale if demand surges faster than the supply of storage resources. For example, the volume of data using up cloud storage resources is growing at a dramatically fast rate, from Terabytes (TBs) to Petabytes (PBs) daily, and in some cases even hourly. Meanwhile, the supply chain for provisioning physical servers and storage devices (e.g., disks) in data centers typically comes with a lead time of 3 to 6 months. Limitations in the expansion of physical capacity are further compounded by limitations in the extent to which storage resources can be practicably managed (e.g., storage account set up and provisioning for a large number of tenants) and monitored for optimization purposes (e.g., monitoring storage usage, demand, and/or availability metrics to make decisions regarding reallocation of storage).

Currently, a technique called "thin provisioning" is commonly used to allocate storage for customers of a cloud storage platform. Thin provisioning is a way to conserve storage resources by assigning only what is currently needed to support an allocation of storage instead of allocating the full amount of space requested for a VM. The tenant gets an acknowledgement of the full amount of storage requested, but the tenant's VM is not allocated additional storage of the requested amount until demand for that additional storage arises. The advantage of thin provisioning is to reduce wastage (i.e., avoiding allocation of storage that is not used) and to reduce costs via statistical multiplexing (i.e., by oversubscribing customers to a logical address space that is larger than the physical storage actually available, which allows for more of the available physical storage to be used and paid for by customers).

However, thin provisioning comes with drawbacks. For example, if thin provisioning is implemented incorrectly, an "out-of-space" condition can occur where customers run out of physical storage space. This "out-of-space" condition can significantly degrade performance (e.g., storage requests, like read/write operations, get stalled or can take much longer to complete) and can also negatively impact the availability of resources (e.g., VMs, containers, storage nodes, etc.).

Furthermore, current cloud storage schemes charge customers based solely on how much storage they are using (e.g., a tenth of a cent per Gigabyte (GB) of storage used), and the only service level agreements (SLAs) that are provided to tenants are based solely on "availability." For example, current SLAs can specify a 99.99% availability of the tenant's data, which can represent that the tenant's requests for his/her data will fail 0.01% of the time over a given time period. In this scenario, the tenant's data will not be lost, but rather access to the data can be temporarily disrupted. However, when it comes to performance of a tenant's applications at runtime, only best effort performance is currently provided by the cloud storage platform, which can lead to the above-noted performance degradations.

SUMMARY

Described herein are techniques and systems for specifying performance-based, potentially in combination with availability-based, storage service level agreements (SLAs), allocating storage in a cloud storage platform based at least in part on the performance-based, and potentially the availability-based, storage SLAs, and implementing mechanisms for scheduling storage requests and for dynamically managing storage allocations for compliance with the performance-based storage SLAs. In order to establish a performance-based storage SLA, a cloud storage service can receive a request, from a tenant, for a storage SLA that specifies one or more storage performance parameters (e.g., a latency parameter, an object size parameter, an input/output (I/O) operations parameter, and/or a throughput parameter, etc.). Upon establishment of the storage SLA, a storage allocation module can then use the storage performance parameter(s) in the storage SLA to determine, for a virtual machine (VM) associated with the requesting tenant, a storage location among a set of candidate storage locations and an amount of storage to allocate for the VM at the storage location. Thereafter, the VM can make storage requests (e.g., perform read/write operations) to and/or from the allocated storage at the storage location such that individual storage requests meet the storage performance parameter(s) specified in the storage SLA. Runtime enforcement of the storage SLA can utilize a scheduling mechanism that buffers individual storage requests into different queues (outbound and inbound queues) that are used for meeting one or more storage performance requirements specified in the storage SLA.

In some configurations, a process for establishing a storage SLA and allocating storage based on the storage SLA includes receiving a request for a storage SLA that specifies one or more storage performance parameters, determining, for a VM and based at least in part on the one or more storage performance parameters in the storage SLA: (i) a storage location among a set of candidate storage locations, and (ii) an amount of storage to allocate. The amount of storage can then be allocated at the storage location for the VM to use in making storage requests.

By establishing and enforcing performance-based storage SLAs in a cloud storage platform, performance guarantees can be made explicit and transparent to the tenants of the cloud storage platform. In this manner, a customer can be guaranteed, for some projected workload specified in the storage SLA in terms of individual storage operations, a minimum performance level for storage requests (e.g., read/write requests), and penalties can be specified for failure to meet the guaranteed performance level. Logs can be used to track workload (e.g., number of storage operations) from a given customer or tenant and track the performance of storage requests in the cloud storage platform to determine compliance with storage SLAs. A cloud storage platform designed to enforce performance-based storage SLAs and to minimize the total SLA penalty in a distributed multi-tenancy system can improve the performance of storage requests (i.e., read and write operations can be completed faster) and can make a cloud storage platform more reliable and efficient by intelligently allocating storage in a manner that minimizes the total SLA penalty. In this regard, the techniques and systems described herein improve the functioning of the computing systems used in a cloud storage platform, and cloud storage technology itself is improved by increasing the speed at which storage requests are completed, as well as increasing the reliability and efficiency of the overall system.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

FIG. 8 is an example computing device architecture for implementing the techniques described herein.

DETAILED DESCRIPTION

Configurations of the present disclosure are directed to, among other things, techniques and systems for specifying performance-based storage SLAs, allocating storage in a cloud storage platform based at least in part on the performance-based storage SLAs, and implementing mechanisms for scheduling storage requests and for dynamically managing storage allocations for compliance with the performance-based storage SLAs. Although many of the examples presented herein are described in terms of a big data, cloud storage platform, such as the Azure® platform offered by Microsoft® Corporation of Redmond, Wash., or the Amazon Web Services (AWS®) platform offered by Amazon Technologies Inc. of Seattle, Wash., the configurations disclosed herein can be implemented in a number of ways and in varying applications. Particularly, the techniques and systems described herein can be applied to any type of hosted storage platform or distributed multi-tenancy storage system that can benefit from improved performance of storage requests.

By the use of the techniques disclosed herein, one or more devices can be configured to conserve resources with respect to power resources, memory resources, communications bandwidth resources, processing resources, and/or other resources while providing mechanisms for specifying and utilizing performance-based storage SLAs in a cloud storage platform. Technical effects other than those mentioned herein can also be realized from an implementation of the technologies disclosed herein.

Figure 1:
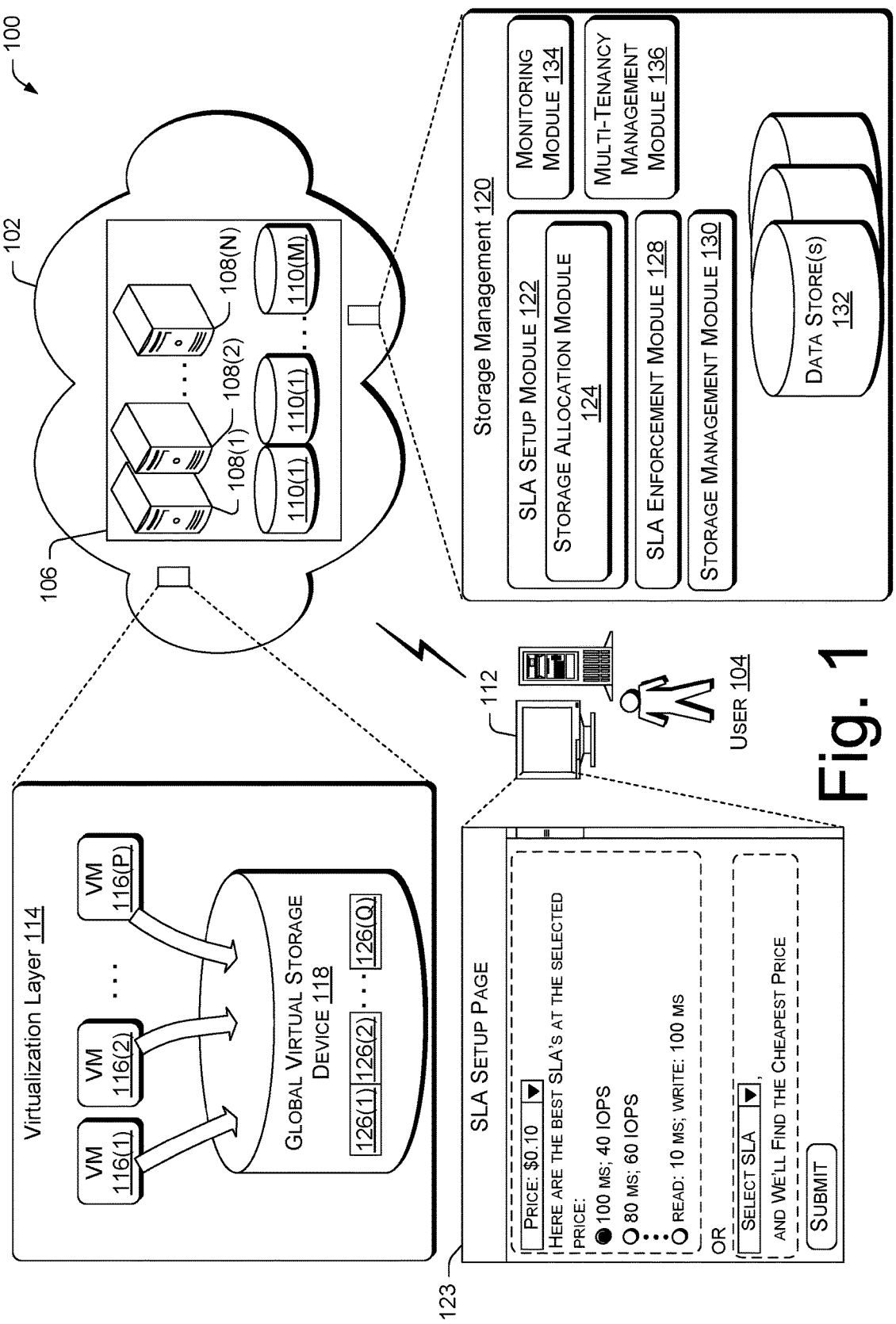
FIG. 1 illustrates an example environment for a cloud storage platform to implement performance-based storage SLAs.

FIG. 1 illustrates an example environment 100 for a cloud storage platform 102 to implement performance-based storage SLAs. Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. Accordingly, the cloud storage platform 102 provides users, such as the user 104, on-demand network access to a shared pool of configurable computing resources as part of a distributed multi-tenancy system. The provisioning of these computing resources is enabled by an infrastructure of physical equipment 106 (i.e., hardware and software) of the cloud storage platform 102. The physical equipment 106 can include any suitable hardware and software components or machines, such as, without limitation, servers, storage devices, networks, networking components, software components (e.g., application server software, database software, etc.), and so on. FIG. 1 shows, as an illustrative example, that the physical equipment 106 includes one or more servers 108(1), 108(2), . . . , 108(N) (collectively "server(s) 108"), and one or more storage devices 110(1), 110(2), . . . , 110(M) (collectively "storage device(s) 110"). In this manner, the cloud storage platform 102 can offer infrastructure, platforms, and/or software as services for which users, such as the user 104, do not need to maintain resources on local machines, such as the local client computing device 112 associated with the user 104.

The terms "user," (such as the user 104) can be used interchangeably herein with the terms "consumer," "customer," or "subscriber" to refer to entities that can subscribe to, or otherwise register for, access to cloud storage resources as a "tenant" of the cloud storage platform 102. In this regard, a "tenant" can comprise an individual user 104 or a group of multiple users, such as when an enterprise with hundreds of employees registers as a tenant of the cloud storage platform 102. Accordingly, the cloud storage platform 102 can utilize a database or a similar data structure to manage registered tenants, including management of accounts and access credentials for the individual users 104.

As noted above, the user 104 can use an associated a client computing device(s) 112 (sometimes referred to herein as "client devices 112") to access services of the cloud storage platform 102. The client device 112 can be implemented as any type of computing devices, including, without limitation, a personal computer, a laptop computer, a desktop computer, a portable digital assistant (PDA), a mobile phone, tablet computer, an electronic book (eBook) reader device, a set-top box, a game console, a smart television, a wearable device (e.g., a smart watch, electronic "smart" glasses, a fitness tracker, etc.), an automobile computer, or any other electronic device that can transmit/receive data over a network(s). Additionally, the cloud storage platform 102 can be accessed over any suitable type of network(s), including wired and/or wireless networks that enable communications between the various entities in the environment 100. In some configurations, communication between the client device 112 and the physical equipment 106 of the cloud storage platform 102 can be performed over cable networks, the Internet, local area networks (LANs), wide area networks (WAN), mobile telephone networks (MTNs), and other types of networks, possibly used in conjunction with one another. Although configurations are described in the context of a web based system, other types of client/server-based communications and associated application logic could be used.

The physical equipment 106 can be geographically-distributed into disparate groupings of servers 106 and storage devices 110, where respective groupings reside within one or more data centers. The data centers themselves can be distributed geographically over a region of any suitable size. In this manner, a vast number of customers, including the user 104, can access the cloud storage platform 102 from geographically disparate locations over the world. The resources of the cloud storage platform 102 can be grouped physically (i.e., the physical equipment 106) or virtually, in any suitable organizational framework such as in a private cloud, a community cloud, a public cloud, or hybrid clouds.

FIG. 1 further illustrates that the cloud storage platform 102 can include various functions and layers that provide, among other things, resource pooling and on-demand self-service characteristics. For example, a virtualization layer 114 is shown as providing hardware virtualization in the cloud storage platform 102. In some configurations, a hypervisor can be used for logically dividing and/or virtualizing various resources (e.g., processing units and memory) of the cloud storage platform 102, and allocating and/or executing one or more virtual entities including, without limitation, one or more virtual machines (VMs) 116(1), 116(2), . . . , 116(P) (collectively VMs 116), and an abstraction of a global virtual storage device 118. A VM 116 can be instantiated on-demand and provisioned for a tenant, such as the user 104, of the cloud storage platform 102 to support an instance of an operating system and/or one or more applications executable on the VM 116. In a distributed multi-tenancy model, the virtualization layer 114 allows for pooling the resources of the cloud storage platform 102 to serve multiple tenants with different physical and virtual resources dynamically assigned and reassigned to individual tenants. In this manner, the user 104 can be provisioned processing and storage resources from the virtualization layer 114 so that the VM 116 assigned to the user 104 can execute software (e.g., applications, operating systems, etc.).

In an illustrative example, the user 104 may want to use services of the cloud storage platform 102 to host applications, compute devices, and/or storage for a new venture, such as a photo sharing venture. Accordingly, the user 104 can register as a tenant and request one or more VMs 116. Alternatively, the user 104 can request a storage account that is accessible from outside of the cloud storage platform 102 without requesting a VM 116. As part of the VM 116 request, the user 104 can specify a desired storage capacity, a desired amount of processing power, a desired amount of memory, a desired amount of bandwidth, and so on, per VM 116 or per group of VMs 116.

FIG. 1 illustrates a storage management function (or layer) 120 that is part of the cloud storage platform 102. The storage management function 120 can be implemented as hardware, software, or a combination thereof, for performing hardware management functions. The storage management function 120 can include a SLA setup module 122 configured to establish an SLA for a requesting customer, such as the user 104 who can request cloud-based resources for his/her new photo sharing venture. Accordingly, as part of a setup process, the SLA setup module 122 can receive a request for a storage SLA that specifies one or more storage performance parameters that are to be met by the cloud storage platform 102 for a given workload specified in the storage SLA in terms of individual storage operations. In this manner, the storage SLA is at least partly "performance-based" in the sense that the storage SLA ensures an expected performance of a tenant's application at runtime (as compared to a mere expected availability of the tenant's data), as measured by the one or more storage performance parameters in the storage SLA.

Figure 2:
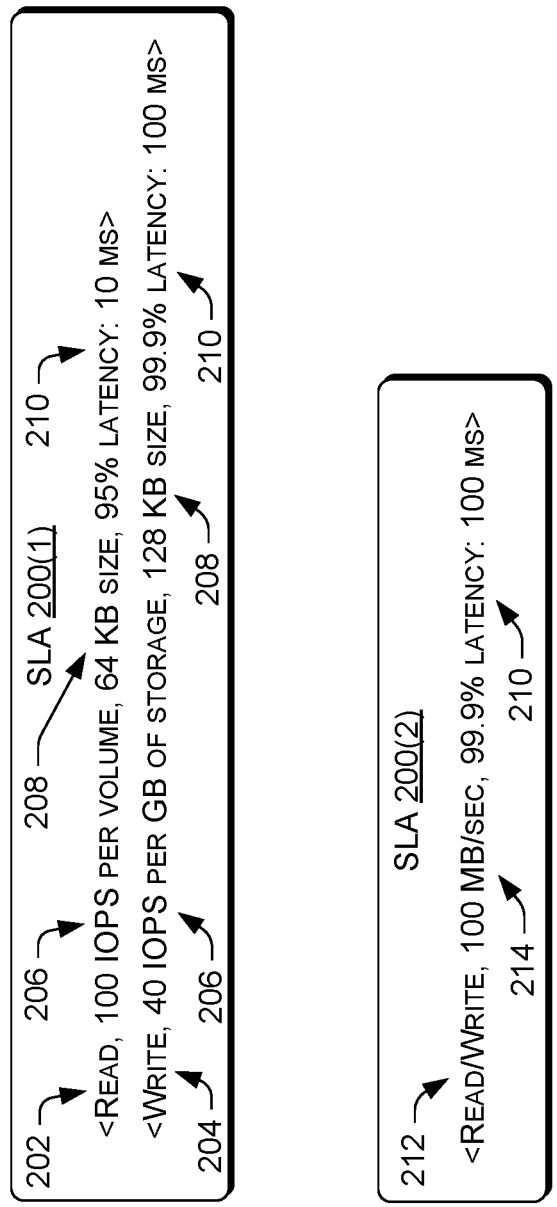
FIG. 2 is a schematic diagram of example performance-based storage SLAs.

Referring briefly to FIG. 2, examples of performance-based storage SLAs are shown as a first storage SLA 200(1) and a second storage SLA 200(2) (collectively storage SLAs 200). It is to be appreciated that the example storage SLAs 200(1) and 200(2) shown in FIG. 2 are merely illustrative and are not limiting on the form of SLA or type of storage performance parameters that can be specified in the storage SLA 200. The first storage SLA 200(1) is an example of a storage SLA 200 that can specify first storage performance parameters for a read operation 202 and second storage performance parameters for a write operation 204, where the second storage performance parameters can be different than the first storage performance parameters. In this manner, a guaranteed performance with respect to a read operation 202 can be differentiated from a guaranteed performance with respect to a write operation 204.

The first storage SLA 200(1) is further shown as specifying, for each of the read operation 202 and the write operation 204, storage performance parameters including, without limitation, an input/output (I/O) operations parameter 206, an object size parameter 208, and a latency parameter 210. In addition to the storage performance parameters shown in FIG. 2, the storage SLA 200 can further specify temporal components, such as, without limitation, peak hours associated with first storage performance parameter values verses off-peak hours associated with second storage performance parameters, week day storage performance parameter values verses weekend storage performance parameter values, seasonal storage performance parameter values, and so on. Furthermore, the storage SLA 200 can also specify availability-based guarantees (e.g., a 99.99% availability) in combination with performance-based guarantees. In this manner, the performance-based guarantees of the storage SLA 200(1) can be specified at a fine level of granularity.

In general, regardless of the type of storage operation (e.g., read or write operation), a storage SLA 200 can be specified in the following format: <Operation=Red/Write, Number of I/O operations, Max size of object per I/O operation, Latency per I/O operation>. Here, the maximum size can be specified in any suitable unit for measuring size of a digital object (e.g., a digital image file, digital video file, text file, etc.) such as Kilobytes (KB), Megabytes (MB), GB, and so on. Latency can be specified in any suitable unit of measuring latency, such as seconds, milliseconds (ms), and so on, and the latency can be specified in terms of distribution over latency requests (e.g., 95% latency: 10 ms). In the first storage SLA 200(1) shown in FIG. 2, the performance guarantees for the read operation 202 are specified in terms of an I/O operations parameter 206 that is set at a value of 100 I/O operations per second (IOPS) per volume. In practice, a read operation 202 (and similarly, a write operation 204) can be associated with multiple I/O requests in that a first portion (e.g., a first 64 MB of a file) of the operation can be executed in a first I/O request, while a second portion (e.g., a second 64 MB of the file) of the operation can be executed in a second I/O request, and so on. In this manner, any given read operation 202 (or write operation 204) can involve multiple I/O requests, and the number of I/O requests that are executed to complete the read operation 202 (or write operation 204) can vary depending on the size of the object being read from (or written to) storage. Thus, the storage SLA 200 can guarantee, for a given volume of storage (a "volume" being constrained in size, such as a 1 TB volume), that a minimum number of I/O operations will be completed per second (or any other suitable time metric). Similarly, the performance guarantees for the write operation 204 are shown in FIG. 2 as being specified in terms of the I/O operations parameter 206 that is set at a value of 40 IOPS per GB of storage, meaning that, for a GB of storage, at least 40 I/O operations will be completed per second to meet the performance guarantees of the storage SLA 200(1).

The object size parameter 208 of the first storage SLA 200(1) represents a constraint on the maximum size of objects being read from, or written to, storage in order to guarantee the performance specified in the remaining storage performance parameters 206 and 210. In other words, the object size parameter 208 can represent the maximum object size that can be read/written at the performance per request specified in the remainder of the storage SLA 200 (e.g., the maximum object size that can be read/written at a specified latency per request, the maximum object size that can be read/written at a specified throughput per request, etc.). This is due to the fact that object size is a factor in the performance of read/write operations. For example, a read operation 202 (and similarly, a write operation 204) takes longer to complete for a larger size (e.g., 128 KB) object than the time it takes to complete the same storage request/operation for a smaller size (e.g., 64 KB) object.

The latency parameter 210 can represent a latency of individual storage requests/operations (e.g., a read request 202, a write request 204, etc.) in terms of response time, or a time to complete the individual storage request. For example, the first storage SLA 200(1) specifies the latency parameter 210 for the read operation 202 as being set to a value of 10 ms at a 95% latency guarantee. This can be interpreted as follows: for a given number (e.g., 1000) of read operations 202), at least 95% of those read operations 202 will complete within 10 ms. Similarly, the first storage SLA 200(1) specifies the latency parameter 210 for the write operation 204 as being set to a value of 100 ms at a 99.99% latency guarantee. This can be interpreted as follows: for a given number (e.g., 1000) of write operations 204, at least 99.99% of those write operations 204 will complete within 100 ms.

While the first storage SLA 200(1) provides an example storage SLA 200 that specifies different performance-based guarantees for the read operation 202 and the write operation 204, respectively, the second storage SLA 200(2) provides an example of a storage SLA 200 that specifies a performance-based guarantee that is agnostic to the type of storage request/operation. One reason for differentiating the read operation 202 from the write operation 204 within the first storage SLA 202(1) is because the speed at which a read operation 202 completes can be different (e.g., faster) than the speed at which a write operation 204 completes. For example, techniques such as caching can increase the speed of a read operation 202, while properties such as durability and consistency of stored data can slow down a write operation 204. However, the second storage SLA 200(2) illustrates how one or more storage performance parameters can be specified for a generic storage operation 212. Accordingly, for a storage operation 212 (e.g., a read operation 202, a write operation 204, or any suitable storage operation), a throughput parameter 214 can be defined in terms of an amount of data per unit time (e.g., 100 MB/second). In some configurations, the first storage SLA 200(1) can specify a throughput parameter 214—like the throughput parameter 214 shown in the second storage SLA 200(2)—in lieu of the I/O operations parameter 206 and the object size parameter 208. Likewise, the second storage SLA 200(2) can specify an I/O operations parameter 206 and an object size parameter 208 in lieu of the throughput parameter 214. In any case, the throughput parameter 214 can represent a minimum throughput per storage operation 212. The latency parameter 210 shown in the second storage SLA 200(2) can again represent a maximum latency of the storage operation 212 in terms of a response time, or time to complete an individual storage operation 212. Thus, the latency parameter 210 represents a maximum value to meet the SLA's 200 storage performance requirements while the throughput parameter 214 represents a minimum value to meet the SLA's 200 storage performance requirements.

The operations and storage performance parameters of the storage SLA 200 are not limited to the operations (e.g., operations 202, 204, and 212) and storage performance parameters (e.g., parameters 206, 208, 210, and 214) shown in FIG. 2. For example, the storage SLA can specify guarantees in terms of availability (e.g., a 99.99% availability), to indicate an availability-based guarantee that a tenant's data will be available 99.99% of the time (or that there is a 0.01% chance that the cloud storage platform 202 will lose the tenant's data). Thus, the storage SLA 200 is not limited to specifying storage performance parameters, such as those shown in FIG. 2. In the absence of any availability guarantees specified in the storage SLA 200, the performance guarantees can be premised on the tenant's data being available (e.g., if the tenant's data happens to be unavailable, the storage SLA 200 may not guarantee the specified performance).

In some configurations, the type of storage can also be made explicit in the storage SLA 200. For example, the storage SLA 200 can specify that the tenant's data is to be stored on a solid state drive (SSD), as opposed to other types of storage devices (e.g., non-volatile random access memory (RAM), tape, and so on). In this manner, the type of storage device that a tenant's data is to be stored on can be made transparent/explicit in the storage SLA 200.

Returning to FIG. 1, the SLA setup module 122 can establish a storage SLA 200 for a tenant in various ways. For example, the SLA setup module 122 can expose an interface. The interface can comprise a user interface (e.g., a graphical user interface (GUI) 123) presented on a display of the client device 112 that presents various options of storage SLAs 200 to the client at different price points. For example, a list of differently-priced storage SLAs 200 can be presented, including, without limitation, a "best effort" storage SLA 200 with minimal storage performance guarantees (e.g., 1 cent for a 500 ms latency guarantee), a first level storage SLA 200 with better storage performance guarantees than the "best effort" storage SLA 200 (e.g., 10 cents for a 100 ms latency guarantee), a second level storage SLA 200 with even better storage performance guarantees than the first level storage SLA 200 (e.g., 15 cents for a 10 ms latency guarantee), and so on. In this manner, the user 104 can choose from a list of differently-priced storage SLAs 200, and the act of selecting a particular storage SLA 200 can cause a request to be issued/submitted for the selected storage SLA 200. Alternatively, the interface exposed by the SLA setup module 122 can comprise an application programming interface (API), such as a representational state transfer (REST) API, which can be called programmatically to providing storage SLA 200 choices for selection.

In some configurations, the storage SLAs 200 that are presented to the user 104 in the GUI 123 can be pre-approved storage SLAs 200 such that an explicit approval response is not required. For example, the GUI 123 in FIG. 1 shows that the user 104 can provide user input to select a price (or price range), and the GUI 123, in response to the price selection, can output a list of the best value SLA choices (e.g., choices of storage SLAs 200 that offer the best storage performance at the selected price). The SLA setup module 122 can be configured to access a database of pre-approved storage SLAs 200 and can rank storage SLAs 200 that are priced at or below the selected price (or within a selected price range) based on storage performance parameters in the storage SLAs 200, and the highest ranking storage SLAs 200 can be output via the GUI 123. Another option shown in the GUI 123 of FIG. 1 is for the user 104 to provide user input selecting a particular storage SLA 200, which, upon selection of a particular storage SLA 200, causes the GUI 123 to present a minimum price for the selected storage SLA 200. In some configurations, an explicit approval response (e.g., "yes" or "no") can be provided by the SLA setup module 122 in response to a storage SLA request. In some configurations, the user 104 can be provided with tools (e.g., free form fields, a sliding scale user interface element, etc.) via the GUI 123 to request a custom storage SLA 200 with customized storage performance parameter values, and the SLA setup module 122 can utilize a calculator to estimate a cost for a custom storage SLA request that the user 104 selects via the GUI 123 tools.

As a helpful analogy, consider a commuter on a toll bridge that can, hypothetically, be guaranteed a minimum time (or speed) at which the commuter will be able to cross the toll bridge depending on the amount of toll paid by the commuter. The commuter in this analogy is analogous to the user 104, the toll amount is analogous to the price for the storage SLA 200, and the guaranteed minimum time (or speed) is analogous to the guaranteed storage performance parameters in the storage SLA 200. In the analogy, the commuter can choose to pay a $10 toll to be guaranteed a bridge crossing of 5 minutes or less, or the commuter can choose to pay a $5 toll to be guaranteed a bridge crossing of 15 minutes or less. The performance guarantees can be associated with a probability value as well, such as 99.99%, meaning that 99.99% of the time, the commuter that pays a $10 toll will be able to cross the bridge in 5 minutes or less. This example analogy is, of course, hypothetical, as it may not be practicably possible to implement such a "performance-tolling" mechanism with the existing transportation infrastructure, but it is a helpful analogy nevertheless. Just as the commuter can pay more for a faster bridge crossing, the user 104 in FIG. 1 can pay more for faster performance in terms of storage operations.

The SLA setup module 122 can further include a storage allocation module 124 configured to determine, for a VM 116 assigned to the user 104 (or tenant), a storage location among a set of storage locations, as well as an amount of storage 126(1), 126(2), ... 126(Q) (collectively "amount of storage" 126, or "storage allocation" 126), which are based at least in part on the storage performance parameter(s) specified in the storage SLA 200. For example, for a given latency parameter 210 specified in the storage SLA 200, the storage allocation module 124 can determine an amount of storage 126(1) to allocate for a VM 116 and a storage location that will meet the latency parameter 210 in the storage SLA 200. As an illustrative example, storage locations that are located proximate to a machine (e.g., server 108) executing the VM 116 can be chosen to meet relatively lower latency performance guarantees of the storage SLA 200. This is due to the fact that the proximity of stored data can dictate performance of reading data from, and writing data to, the storage location. Similarly servers or racks with low network traffic can be chosen since they will have minimal congestion or interference to storage traffic. The storage allocation 126(1) provisioned for the requesting user 104 can be specified as part of the global virtual storage device 118 that is provided as an abstraction to the VMs 116. Accordingly, the VMs 166 can issue storage requests to the global virtual storage device 118 at runtime. Thus, SLA performance guarantees can be met for a storage request/operation 212 issued by a VM 116, regardless of where the servers 108 running the VMs 116 are located and/or where data is physically stored on the storage devices 110 of the cloud storage platform 102. The storage allocation module 124 is configured to determine the optimal placement of a storage allocation 126 that will minimize a total SLA penalty in a distributed multi-tenancy system and/or a placement that will meet the specified storage SLA performance guarantees in a particular storage SLA 200.

Figure 3:
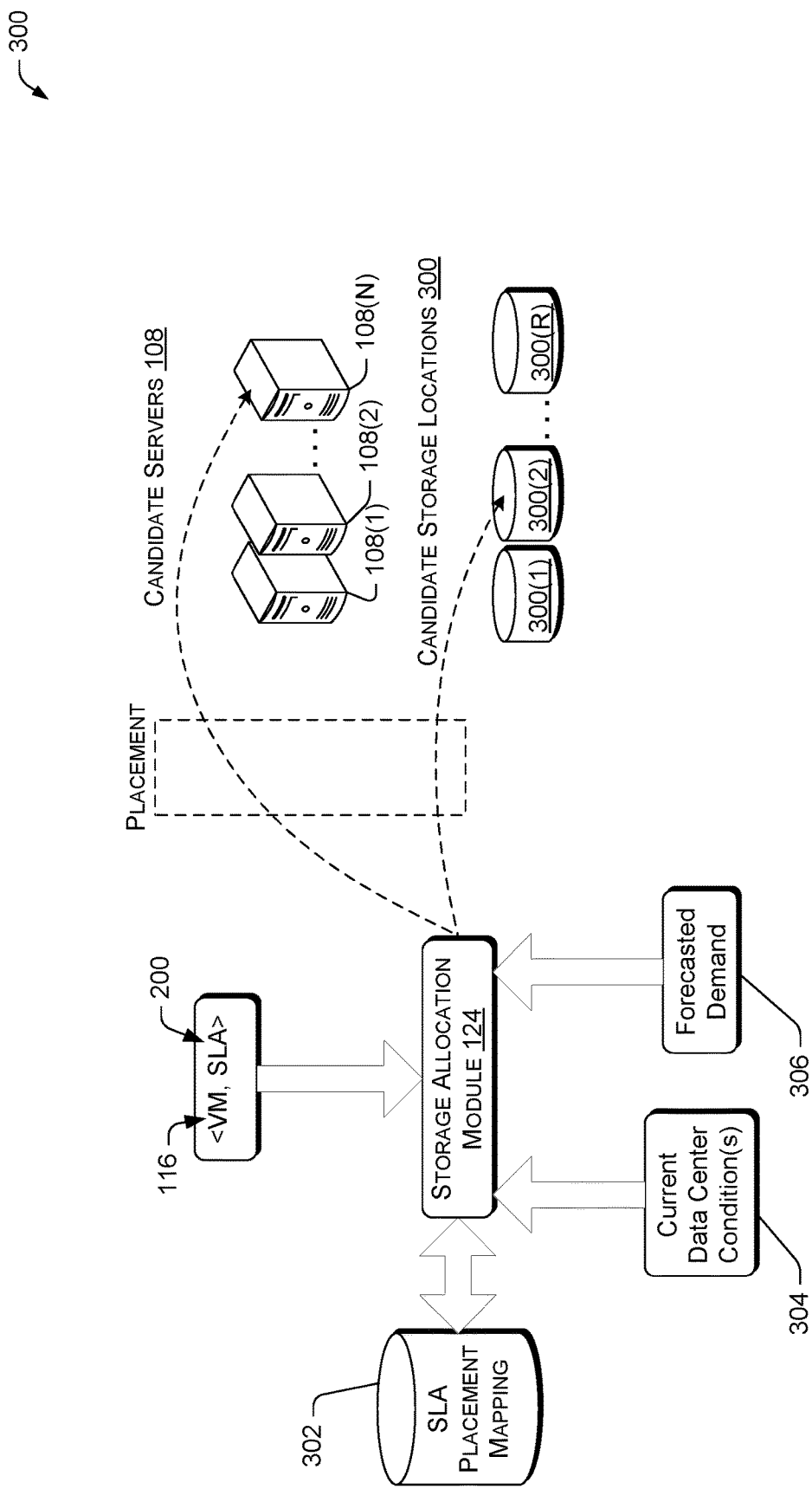
FIG. 3 is a schematic diagram of an example storage allocation technique based on a performance-based storage SLA.

Referring briefly to FIG. 3, a schematic diagram of a storage allocation technique that can be carried out by the storage allocation module 124 is shown. The storage allocation module 124 can consider various inputs in determining placement of both storage allocations 126 and VMs 116. At least one of the inputs that can factor into the placement algorithm is the characteristics of a particular VM 116. For example, the VM 116 may be specified with a particular level of computing power (e.g., central processing unit (CPU) capacity) that dictates placement of the VM 116 on a server 108 among a set of candidate servers 108(1)-(N) of the cloud storage platform 102. For example, a server 108 with capacity to execute the VM 116 can be chosen to host the VM 116.

The storage allocation module 124 can further choose a storage location 300 among a set of candidate storage locations 300(1)-(R). An input for this placement determination can comprise the storage SLA 200 and the storage performance parameter(s) specified therein. In this aspect of the placement algorithm, the storage locations 300 can correspond to locations of individual ones of the storage devices 110 of the cloud storage platform 102, such as locations of candidate SSDs in various data centers, and the like. In this manner, the storage allocation module 124 can choose an optimal placement of allocated storage 126 from the global virtual storage device 118 that will likely meet the storage performance parameter(s) specified in the storage SLA 200.

As another input to the placement algorithm, the storage allocation module 124 can consider a SLA placement mapping 302 that specifies mappings between storage locations 300 (and/or types of storage devices 100) and SLA storage performance parameter values, such as values (or value ranges) of latency parameters 210, throughput parameters 214, I/O operations parameters 206, and/or object size parameters 208. For example, storage locations 300(1)-(3) of the candidate storage locations 300 can be mapped to a latency parameter 210 value range of 0 to 10 ms, while storage locations 300(4)-(6) can be mapped to a latency parameter 210 value range of 10 ms to 50 ms, and so on. In this manner, decisions regarding the placement of storage allocations 126 at different storage locations 300 among the candidate set of storage locations 300(1)-(R) can be made via lookups to the SLA placement mapping 302. Likewise, a first type of storage device (e.g., SSD) can be mapped to a first latency parameter 210 value range in the mapping 302, while a second type of storage device (e.g., tape) can be mapped to a second latency parameter 210 value range in the mapping 302, and so on. Furthermore, storage location 300-storage type combinations can be mapped to storage performance parameter values (or value ranges), and a storage location 300 or a storage type can be mapped to combinations of two or more storage performance parameters and their respective values (or value ranges). The mappings in the SLA placement mapping 302 can be based on previous measurements of storage performance parameters, such as previous measurements of latency of read/write operations, and the like.

FIG. 3 also illustrates that additional inputs to the placement algorithm can include a current data center condition(s) 304 and/or forecasted demand 306. The current data center condition(s) 304 can include, without limitation, a current workload/demand on the equipment 106 of a given data center, a current capacity of the data center (e.g., free storage available), and the like. Current workload/demand can be based on a percentage or proportion of resource usage, a number or frequency of requests from users 104 of the cloud storage platform 102, and similar metrics.

The forecasted demand 306 can output a predicted workload/demand on the cloud storage platform 102 that is based on any suitable forecasting approach or model. The forecasted demand 306 can be based on any suitable regression function or machine learning model including, without limitation, an autoregressive integrated moving average (ARIMA) model, a logistic regression-based classification model, a tree-based model, a support vector machine (SVM), a kernel method, a neural network, a random forest, a spline (e.g., multivariate adaptive regression spline), a hidden Markov model (HMM), a Kalman filter (or enhanced Kalman filter), a Bayesian network (or Bayesian belief network), expectation maximization, a genetic algorithm, a linear regression algorithm, a nonlinear regression algorithm, or an ensemble of one or more of the aforementioned techniques. As an illustrative example, workload on the cloud storage platform's 102 resources can spike during peak times (e.g., weekends where users are uploading photos from activities) such that historical trends can be analyzed with any of the above-mentioned models to predict future demand. The output of the forecasted demand 306 can be used by the storage allocation module 124 to determine an amount of storage 126 to allocate to a requesting user at a particular time (and/or a storage location 300 among the candidate storage locations 300). An example algorithm to use in determining the amount of storage 126 to allocate for a tenant at time, t+1, is shown in Equation 1:

$$\text{StorageAllocated}(t+1) = a*\text{Storage\_estimated}(t+1) + (1-a)*\text{Storage\_used}(t) \tag{1}$$

Here, "a" is a configurable parameter that can be set to a value within the range of 0 to 1 ($0 \leq a \leq 1$). Thus, if a=0, the allocated storage 126 is set to an amount of storage used at a previous time instance, t. If a=1, the allocated storage 126 is based on an estimated demand, per Equation (1). It is to be appreciated that the algorithm of Equation 1 is but one example of a suitable algorithm that can be used by the storage allocation module 124 in determining an amount of storage 126 to allocate for a requesting tenant.

Storage allocation operations performed by the storage allocation module 124 can support multi-tenancy storage resource management with a customer profile and storage account mapping, as well as provision and allocate storage accounts in real-time with two or more levels per a machine learning algorithm, as discussed herein. The storage allocation module 124 can further implement automatic allocation transfer from one data center to another data center according to the storage account availability in the other data center, as well as provision and allocate storage accounts in multiple distributed data centers at the same time for high data availability. It is further to be appreciated that storage in the cloud storage platform 102 can be partitioned into multiple shards. All of the shards for a single customer 104 or tenant do not have to reside on a single physical storage device 110 and can be distributed over multiple storage devices 110 of the cloud storage platform 102.

Returning to FIG. 1, after storage is allocated for a VM 116, the storage management function 120 can implement runtime enforcement and dynamic storage adaptation using various modules. For example, the storage management function 120 can include a SLA enforcement module 128, a storage management module 130, and one or more data stores 132.

Figure 4:
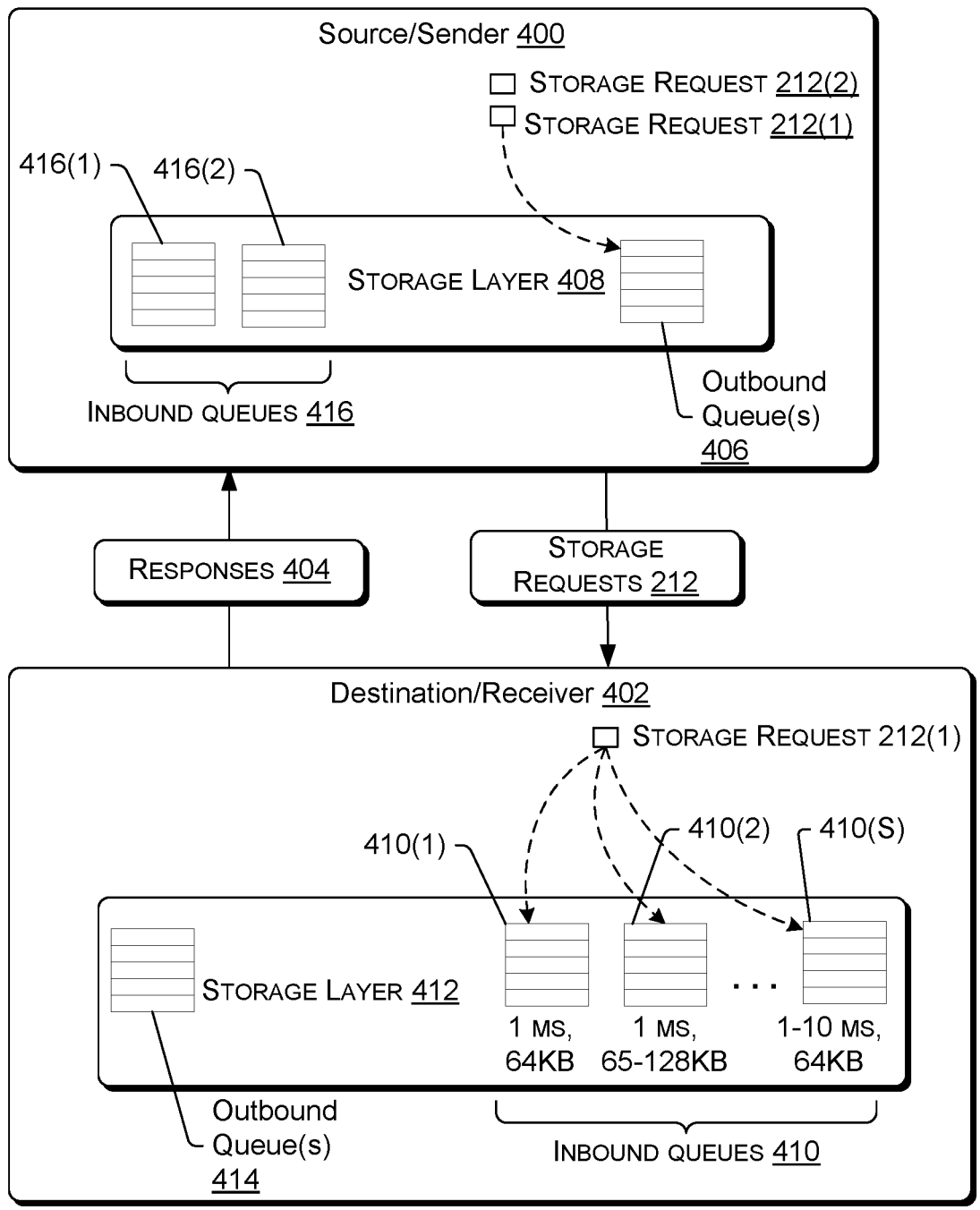
FIG. 4 is a schematic diagram of an example scheduling technique for scheduling storage requests to meet a storage performance requirement(s) specified in a performance-based storage SLA.

The SLA enforcement module 128 can be configured to schedule storage requests 212 that are issued by VMs 116 when VMs 116 are executed in the cloud storage platform 102. Referring briefly to FIG. 4, a schematic diagram of an example scheduling technique for scheduling storage requests 212 is shown. FIG. 4 depicts a source/sender 400 that issues or transmits storage requests 212 to a destination/receiver 402. Responses 404 are transmitted from the destination/receiver 402 back to the source/sender 400. In FIG. 4, the storage requests 212 can comprise read operations 202, write operations 204, or any suitable storage operation that can be issued by a VM 116. In an illustrative example, the user 104 can upload one or more photos to a photo sharing application that is executed by the VM 116. As part of the upload, the VM 116 can issue a write operation 204 to store data representing a digital image file. The write operation 204 can be directed to a logical address space that maps to storage location allocated for the user 104.

To illustrate the example scheduling technique, FIG. 4 shows a first storage request 212(1) and a second storage request 212(2) that can be issued over a period of time. For example, both storage requests 212(1) and 212(2) can be issued over a period of one second. The SLA enforcement module 128 is configured to schedule the incoming requests 212(1) and 212(2) for processing such that the performance guarantees of the storage SLA 200 for the associated VM 116 are met. FIG. 4 shows that an outbound queue(s) 406 can be established in a storage layer 408 of the source/sender 400 for placement of outbound storage requests 212. The outbound queue(s) 406 can be used to release the storage requests 212 at a frequency (or at respective times) that complies with a storage performance parameter of the relevant storage SLA 200 (e.g., the I/O operations parameter 206, the throughput parameter 214, etc.). For example, the SLA enforcement module 128 can determine a number of I/O operations that are needed to perform the storage requests 212(1) and 212(2), and can queue the storage requests 212(1) and 212(2) in the outbound queue 406 such that they are released (or transmitted) at a frequency that is at, or above, the specified frequency in the I/O operations parameter 206. The outbound queue(s) 406 can also act as buffers to absorb sudden spikes in requests 212, which can exceed the rate at which the requests 212 are released (or transmitted). In this manner, a plurality of incoming requests 212 can be queued in the outbound queue(s) 406 so that the requests 212 are not lost, and then the requests 212 can be "dequeued" or released at the specified rate and order to meet the storage SLA 200. The SLA enforcement module 128 can determine the storage performance parameter(s) of the storage SLA 200 in various ways. In some configurations, the storage performance parameter(s) of the storage SLA 200 can be included in a packet representing the incoming storage request 212. In other configurations, an identifier of an application associated with the storage request 212 can be included in a packet of the incoming storage request 212, and the identifier can be mapped to the storage SLA 200.

When the storage request 212(1) is received at the destination/receiver 402, the SLA enforcement module 128 can determine an inbound queue 410 of multiple inbound queues 410 in which to place the storage request 212(1) for processing in accordance with the associated storage SLA 200. The determination of a particular inbound queue 410 can be based on a token bucket algorithm. The inbound queues 410 can be defined in a storage layer 412 of the destination/receiver 402 and associated with different values (or value ranges) of storage performance parameters. For example, a first inbound queue 410(1) can be associated with a first latency parameter 210 value (or value range) and/or a first object size parameter 208 value (or value range), etc., while a second inbound queue 410(2) can be associated with different storage performance parameters, and so on for any number of "S" inbound queues 410.

FIG. 4 shows that the first inbound queue is associated with a latency value of 1 ms or less and an object size of 64 KB or less. In this manner, if the storage SLA 200 associated with the storage request 212(1) specifies a latency parameter 210 value at or below 1 ms, as well as an object size parameter 208 value at or below 64 KB, the storage request 212(1) can be placed in the first inbound queue 410(1) of the storage layer 412. If, on the other hand, the storage performance parameter values specified in the storage SLA 200 meet the values, or fall within the value ranges, of another inbound queue 410, the storage request 212(1) can be placed in the other inbound queue 410 for processing. In this manner, high priority storage requests 212 can be placed in high priority inbound queues 410, and low priority storage requests 212 can be placed in low priority queues 410 so that a total SLA penalty can be minimized by processing storage requests 212 pursuant to storage performance parameters specified in their corresponding storage SLAs 200. Although the inbound queues 410 are depicted in FIG. 4 as a single set of inbound queues 410, the storage layer 412 of the destination/receiver 402 can define multiple sets of inbound queues 410, each set of inbound queues 410 being specific to a type of storage operation 212 (e.g., a read operation 202, a write operation 204, etc.). For example, a first set of inbound queues 410 can be defined for read operations 202, and a second set of inbound queues 410 can be defined for write operations 204. Similarly, a first outbound queue(s) 406 in the storage layer 408 of the source/sender 400 can be defined for read operations 202, and a second outbound queue(s) 406 can be defined for write operations 204.

An outbound queue(s) 414 in the storage layer 412 of the destination/receiver 402 can be utilized for buffering the responses 404 that are to be returned to the source/sender 400. The responses 404 can comprise acknowledgement responses that are issued in response to write requests 204, or the response 404 can comprise data that is returned to the source/sender 400 in response to a read request 202. Accordingly, the storage layer 408 of the source/sender 400 can include multiple inbound queues 416, including a first inbound queue 416(1) for receiving acknowledgement responses 404 in response to write requests 204, and a second inbound queue 416(2) for receiving data in response to read requests 202. Using the example scheduling technique shown in FIG. 4, the response time for completing an individual storage request 212 is likely to comply with the storage performance parameter(s) (e.g., the latency parameter 210 value) specified in the storage SLA 200 due to the placement of the storage request 212 in the appropriate queues (e.g., the appropriate inbound queue 410) for processing according to the performance guarantees in the storage SLA 200. Moreover, the scheduling technique shown in FIG. 4 can mitigate the effects of "burstiness" in the storage requests 212 (e.g., a sudden spike over a short period of time).

Returning to FIG. 1, the storage management module 130 can be configured to dynamically adapt storage allocations to minimize a total SLA penalty. That is, the storage management module 130 can evaluate the initial placement of allocated storage 126 determined by the storage allocation module 124 and determine if there is a better allocation arrangement (i.e., better placement of VMs 116, better amount of storage 126 to allocate, better storage locations 300, etc.) that will optimize the system in terms of minimizing a total SLA penalty. That is, in a distributed multi-tenancy model, penalties associated with a plurality of storage SLAs 200 can be aggregated, and different placement scenarios can be evaluated by the storage management module 130 to determine if a storage adaptation operation can reduce the total SLA penalty. In some scenarios, a storage adaptation operation can move a storage allocation 126 of a tenant to a new storage location 300 that violates that tenant's storage SLA 200, so long as the total SLA penalty is reduced as a result of moving the storage allocation 126 of the tenant to the new storage location 300. A storage adaptation operation can comprise moving a VM 116 to a different host server 108, moving allocated storage 126 to a different storage location 300, partitioning storage, consolidating storage, de-duplicating data, utilizing remote direct memory access (RDMA), migrating data from overloaded nodes to under loaded nodes, and so on. Storage de-duplication can comprise detection of duplicate copies of the data stored by a customer 104 (e.g., via comparing hashes of page contents in a storage device 110, such as an SSD, disk, etc.). RDMA can represent a local memory-remote memory communication technique to reduce latency for writes (e.g., when the local storage doesn't have enough capacity or cannot meet the relevant storage SLA 200, a neighboring server 108, such as a server 108 in the same rack, can be selected to store writes in the selected server's 108 associated storage device 110, which are then made persistent without sacrificing performance of the write operations 204. Dynamic data migration can comprise migrating hot (i.e., high demand) objects from overloaded nodes to under loaded nodes in a neighborhood proximity (e.g., within a threshold geographic distance or networking distance).

The storage management module 130 can consider various inputs in determining whether and how to adapt existing storage allocations. Such inputs considered by the storage management module 130 can include, without limitation, the storage SLAs 200 that are in place (established) for the multiple tenants of the cloud storage platform 102, a current data center condition(s) 304, and/or forecasted demand 306 (described with reference to FIGS. 2 and 3). In this manner, the storage management module 130 can adapt the storage allocations to improve the performance of storage operations 212 by enabling more efficient access to allocated storage 126 that reduces, or minimizes, the total SLA penalty.

In some configurations, machine learning models can be implemented to provision and allocate storage accounts in advance and in real-time in a particular storage location 300 for dedicated customers and tenants. To provide high availability of data, the data can be stored in multiple copies (e.g., three or more copies) in different fault-independent domains (e.g., data centers). However, the availability of the storage accounts in different data centers and regions of the cloud storage platform 102 can be different. Machine learning can predicate storage accounts in two or more levels for different data centers. In this scenario, the first level can be in a large time window for well planning and emergency reduction, while the second and other levels can be in a specific data center and customer level for specific storage account allocation in real-time.

The data store(s) 132 can be used to store various types and amounts of data utilized by the various modules of the storage management function 120. For example, the data store(s) 132 can include monitoring data and key performance indicator (KPI) metrics from monitoring functions provided by the cloud storage platform 102, machine learning models used to predict future/forecasted storage demand in making storage allocation decisions and adjustments, customer profiles and status metadata, customer/tenant storage accounts, mapping tables that map storage shards, and so on.

In some configurations, the storage management function 120 can further include a monitoring module 134 configured to meter ingestion-related metrics associated with data ingested to the cloud storage platform 102, as well as storage-related metrics relating to usage and performance of storage resources of the cloud storage platform 102, as well as workload placed on the cloud storage platform 102 as resources are utilized. The metering performed by the monitoring module 134 can comprise keeping logs of various metrics, and monitoring can be distributed across different data centers or regions of the cloud storage platform 102.

In some configurations, the monitoring module 134 can monitor data collection and ingestion flow rates using an incremental buffer calculation technique. The monitoring of ingestion flow rates can be in any suitable unit of measurement, such as MB/s, GB/s, and so on. In some configurations, the monitoring module 134 can monitor data source location and associated customer identifier (ID) from a data packet header, data filtering or re-packaging size for metering the data volume more precisely, and/or data ingested storage location based on the storage partition assignment.

In some configurations, the monitoring module 134 can monitor storage-related aspects of the cloud storage platform 102 including, without limitation, a remaining storage size or capacity of storage devices 110, data storing rate in individual storage accounts of tenants, a potential grooming rate (e.g., de-duplication), as well as storage performance in terms of response times to complete storage operations 212 (e.g., time to complete read operations 202, write operations 204, and/or any similar storage operation). In some configurations, a history checkpoint calculation technique can be used to monitor data storing rate and/or potential data grooming rate based on a grooming schedule. In some configurations, the monitoring module 14 can monitor storage account health status based on a light-weight heart-beat mechanism with regard to individual tenant accounts, data source location and customer profile for understanding the data owner's profile, data access frequency against data ingestion frequency of their network usage, and so on.

In some configurations, the storage management function 120 can include a multi-tenancy management module 136 to support multiple users 104 sharing the same instance in the cloud storage platform 102, including data processing, data storage, and data transfer. It is to be appreciated that although a multi-customer sharing model is supported, data of individual customers can be isolated and protected in the cloud storage platform 102 for security purposes. The multi-tenancy management module 136 can support multiple storage accounts per single customer 104, one storage account per customer 104, and/or multiple customers 104 per storage account.

The processes described herein are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Moreover, in some configurations, one or more blocks of the processes can be omitted entirely.

Figure 5:
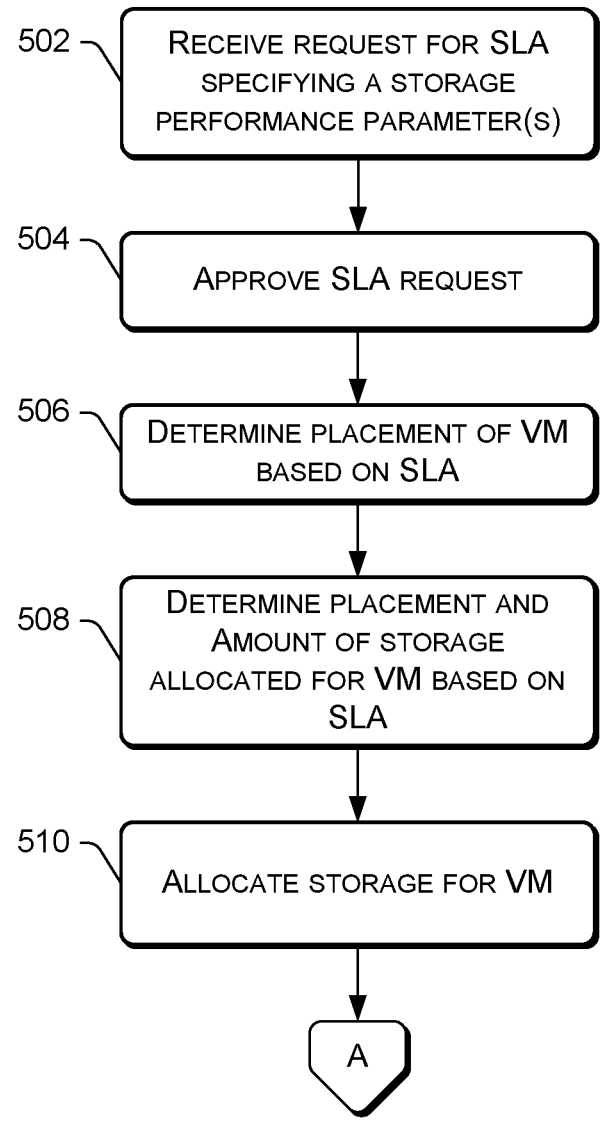
FIG. 5 is a flow diagram of an example process of allocating storage based at least in part on a performance-based storage SLA.

FIG. 5 is a flow diagram of an example process 500 of allocating storage based at least in part on a performance-based storage SLA 200. The process 500 is described with reference to the previous Figures. Particular reference may be made to the SLA setup module 122 and the storage allocation module 124.

At 502, the SLA setup module 122 can receive a request for a storage SLA 200 that specifies one or more storage performance parameters. The request can be made by selecting a storage SLA 200 from a plurality of storage SLA options presented in a GUI 123 on the client device 112, using a tool to request a custom storage SLA, or any suitable method, as described herein. The one or more storage performance parameters can include any suitable storage performance parameter, such as those parameters described with reference to FIG. 2.

At 504, the SLA setup module 122 can approve the SLA request received at 502. The approval at 504 can be in the form of an explicit approval message transmitted to the client device 112, or an implicit approval based on a plurality of pre-approved storage SLA options presented to the user 104 via the GUI 123 of the client device 112.

At 506, the storage allocation module 124 can determine a server 108 among a set of candidate servers 108 for hosting a VM 116 associated with the storage SLA 200 and/or the requesting tenant. The determination of the server 108 that is to host the VM 116 can be based at least in part on the storage performance parameter(s) specified in the approved storage SLA 200. For example, a server 108 with capacity or capabilities to execute the VM 116 at a level of performance that will meet the storage performance parameter(s) specified in the storage SLA 200 can be chosen at 506.

At 508, the storage allocation module 124 can determine a storage location 300 among a set of candidate storage locations 300 and an amount of storage to allocate for the VM 116 based at least in part on the storage performance parameter(s) specified in the storage SLA 200. In regards to the storage location 300, if relatively higher storage performance levels are specified in the storage performance parameter(s) of the storage SLA 200, a storage location 300 that is relatively close in proximity (e.g., within a threshold distance, measured in terms of geographical distance or network distance (i.e., number of network hops)) to the host server 108 can be chosen to meet that relatively stringent storage performance guarantees of the storage SLA 200. If the storage performance guarantees are relatively low (e.g., close to "best-effort performance in terms of higher maximum latency parameter 210 values, and the like), a storage location 300 that is relatively farther in geographic or network distance from the host server 108 (i.e., hosting the VM 116) can be chosen at 508. In some configurations, the storage allocation module 124 can reference a mapping (e.g., the SLA placement mapping 302) to determine the storage location 300 at 508. The mapping 302 can specify correlations between storage locations 300 and storage performance parameters, such as latency parameter values (or value ranges), and the like. In some configurations, the determination of the storage location 300 at 508 can be based at least in part on a current data center condition(s) 304, such as a current workload, current capacity, number or frequency of requests from client devices 112, and so on. In some configurations, the determination of the storage location 300 at 508 can be based at least in part on a prediction of future demand (e.g., the forecasted demand 306) on the cloud storage platform 102. For example, any suitable regression algorithm or machine learning model, as described herein, can be used to predict future demand and provide the forecasted demand 306 as an input to the storage placement algorithm.

Regarding the amount of storage 126 determined at 508, the determination of the amount of storage 126 can be based on any suitable factor, such as a current data center condition(s) 304, forecasted demand 306 on the cloud storage platform 102, and the like. Furthermore, any suitable technique or algorithm can be used to determine the amount of storage 126 to allocate for a VM 116, such as the algorithm of Equation (1).

At 510, the amount of storage determined at 508 can be allocated at the storage location 300 determined at 508 for the VM 116 to use in making storage requests 212 (e.g., read requests 202, write requests 204, etc.). Accordingly, the process 500 of intelligently determining placement of the VM 116 and placement and amount of allocated storage can improve the performance of storage operations 212 performed in the cloud storage platform 102 to meet individual storage SLAs 200 and to reduce, or minimize, a total SLA penalty, which results in a cloud storage platform 102 with improved performance and efficiency.

Figure 6:
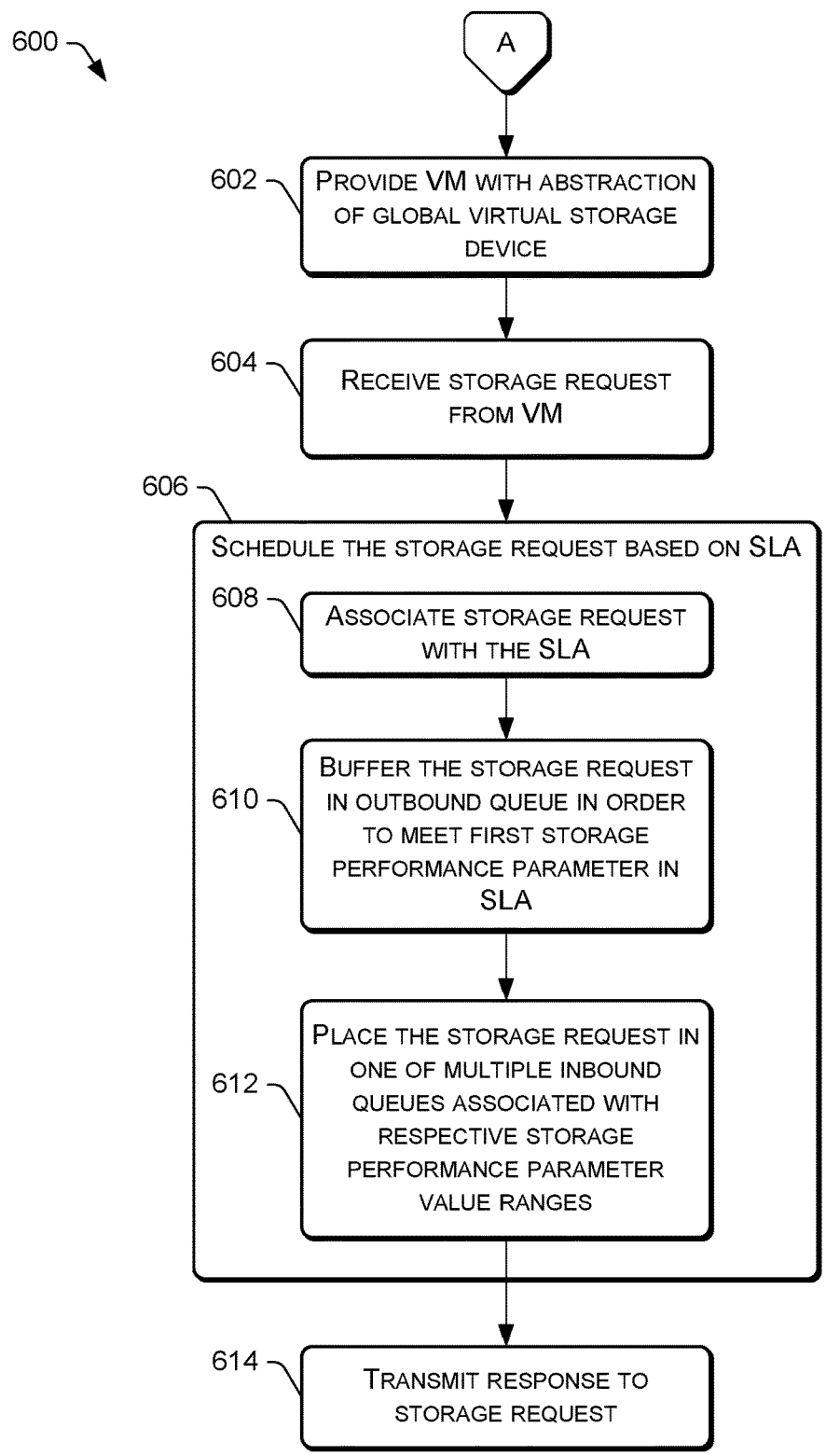
FIG. 6 is a flow diagram of an example process of scheduling a storage requests during runtime enforcement of a performance-based storage SLA.

FIG. 6 is a flow diagram of an example process 600 of scheduling a storage requests 212 during runtime enforcement of a performance-based storage SLA 200. The process 600 is described with reference to the previous Figures. Particular reference may be made to the SLA enforcement module 128. Moreover, the process 600 can continue from step 510 of the process 500, as shown by the off-page reference "A" in FIGS. 5 and 6.

At 602, a VM 116 can be provided with an abstraction of a global virtual storage device 118. Tenants can be assigned a portion of the global virtual storage device 118 with the capacity they requested that meets the specified storage SLA 200 performance guarantees, and that is independent of where the tenants' VMs 116, containers, or storage nodes are located (so as to not limit the storage allocation to a specific storage location). In general, the VM 116 can issue storage requests 212 to an allocated portion 126 of the global virtual storage device 118. Writing/reading to/from the global virtual storage device 118 can utilize a count or key associated with data objects and storage SLAs 200 so as to avoid having to utilize specific addresses for read/write operations. The amount of storage 126 can be allocated using the process 500 of FIG. 5, for example.

At 604, the SLA enforcement module 128 can receive a storage request 212 from the VM 116. For example, as part of an upload request from the user 106 to upload a file of a digital image, the VM 116 can issue a storage request 212 in the form of a write request 204 to write the digital image to a portion of the allocated storage 126.

At 606, the SLA enforcement module 128 can schedule the storage request 212 based at least in part on a storage SLA 200, such as the storage SLA 200 established during the example process 500 of FIG. 5.

The scheduling of the storage request 212 at 606 can include a sub-process that includes operations for buffering the storage request 212 into one of multiple available queues for processing the storage request 212 in accordance with the storage performance parameter(s) specified in the storage SLA 200. An example sub-process is shown in FIG. 6, and is described as follows.

At 608, the storage request 212 can be associated with the storage SLA 200. For example, the storage request 212 can include storage performance parameter(s) of the storage SLA 200 in a packet as part of the storage request 212. As another example, the storage request 212 can include an identifier of an application, or the VM 116, issuing the storage request 212, and can reference a mapping between VMs 116 or applications and storage SLAs 200 to determine a relevant storage SLA 200 to associate with the storage request 212.

At 610, the storage request 212 can be buffered in an outbound queue 406 in order to meet a first storage performance parameter in the storage SLA 200. For example, the first storage performance parameter can comprise the I/O operations parameter 206 that defines a minimum number of I/O operations per unit time (e.g., per second) for a predetermined amount of memory/storage. In this manner, the SLA enforcement module 128 can release the storage request 212 from the outbound queue 406 at a frequency that meets or exceeds the I/O operations parameter 206 specified in the storage SLA 200.

At 612, the storage request 212 can be placed in an inbound queue 410 among multiple inbound queues 410 that are associated with respective storage performance parameter values or value ranges. For example, a second storage performance parameter specified in the storage SLA 200 can be a latency parameter 210. The storage request 212 can be placed in an inbound queue 410 among the set of inbound queues 410 based at least in part on the value of the latency parameter 210, for example. Thus, for a latency parameter 210 value of 0 to 1 ms, the storage request 212 can be placed in an inbound queue 410 that corresponds to a latency parameter 210 value range of 0 to 1 ms. In some configurations, two or more storage performance parameters can be considered in determining which inbound queue 410 among the set of inbound queues 410 to place the storage request 212. For example, the storage request 212 can be placed in an inbound queue 410 that is associated with a particular latency parameter 210 value range, and a particular object size parameter 208 value range (e.g., 0-1 ms latency, and 65-128 KB object size).

At 614, a response 404 can be transmitted in response to the storage request 212. The response 404 can include an acknowledgement when the storage request 212 comprises a write request 204, or data when the storage request comprises a read request 202. In this manner, the process 600 enables scheduling a storage request 212 (e.g., a read request 202, write request 204, or any other suitable storage request) in accordance with storage performance parameters of a storage SLA 200 so that the performance guarantees of the storage SLA 200 are met.

Figure 7:
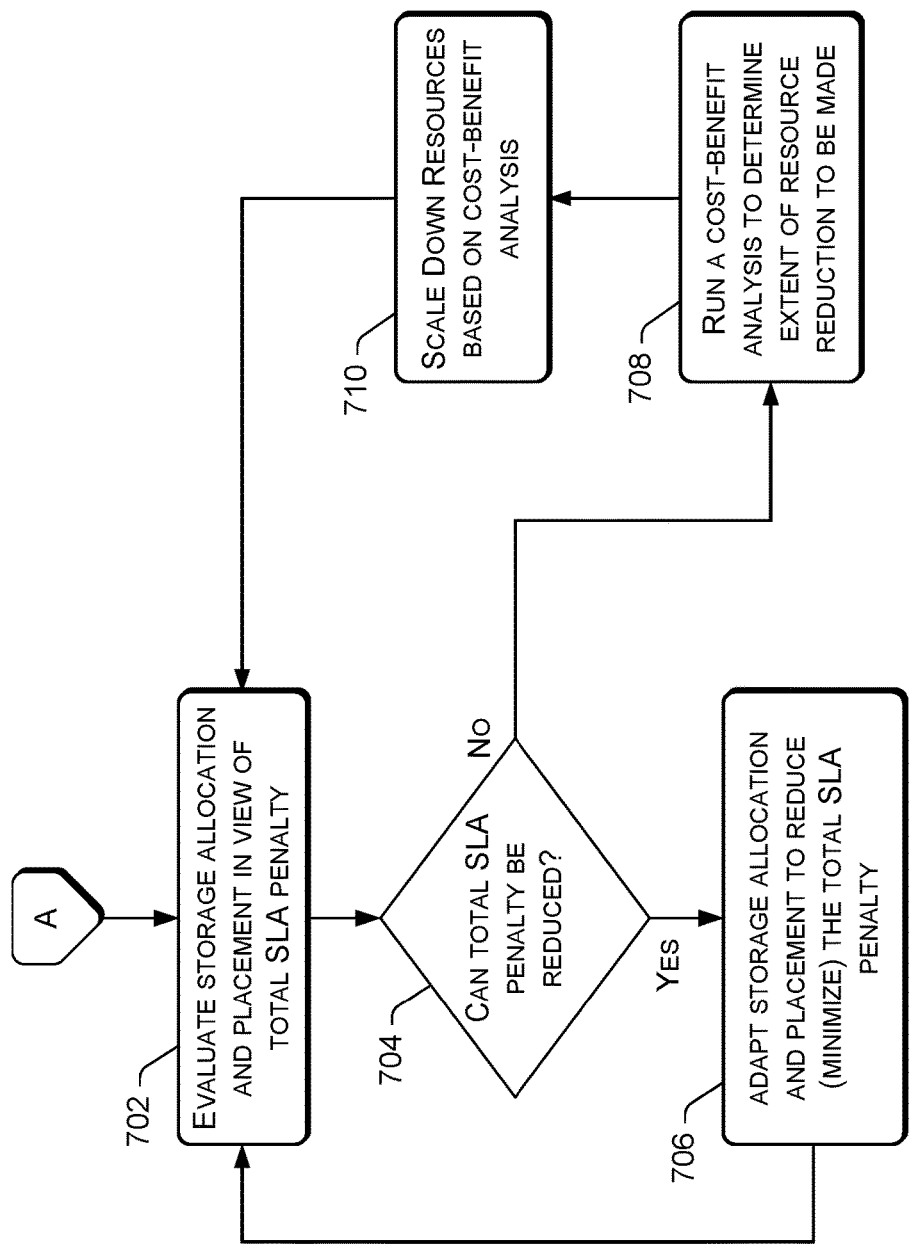
FIG. 7 is a flow diagram of an example process of dynamically adapting a storage allocation based at least in part on performance-based storage SLAs.

FIG. 7 is a flow diagram of an example process 700 of dynamically adapting a storage allocation based at least in part on performance-based storage SLAs 200. The process 700 is described with reference to the previous Figures. Particular reference may be made to the storage management module 130. Moreover, the process 700 can continue from step 510 of the process 500, as shown by the off-page reference "A" in FIGS. 5 and 7.

At 702, a storage allocation 126, such as the storage allocated at step 510 of the process 500, can be evaluated by the storage management module 130. The evaluation at 702 can comprise an evaluation of the amount of storage 126 allocated and/or the storage location 300 at which the amount of storage 126 was allocated. Furthermore, the evaluation at 702 can be based at least in part on a total SLA penalty for a plurality of tenants of a distributed multi-tenancy system, such as the cloud storage platform 102. For example, the storage location 300 can be evaluated by comparison against other candidate storage locations 300 and the effect that each storage placement has on the total SLA penalty. For example, the total SLA penalty can be estimated based on an aggregation of the storage SLAs 200 established for the plurality of tenants for each storage location 300 allocation. In some embodiments, the evaluation can use heuristics (e.g., evaluation of candidate storage locations 300 with shorter distances (e.g., network distance or geographic distance) to the server 108 hosting the VM 116 that is to issue storage requests 212 to the storage location 300, as compared to a distance from the current storage location 300 to the host server 108.

Furthermore, different amounts of storage 126 can be evaluated at 702 to determine the impact on the total SLA penalty in different scenarios. For example, if the amount of storage 126 in a current allocation is decreased because not all of the allocated storage is being used, and room can be made on a storage device 110 so that another storage allocation 126 can be moved to the storage device 110, this combination of storage adaptation operations can be evaluated against the total SLA penalty to see how the total SLA is affected (i.e., increased, reduced, unchanged). In some configurations, additional inputs or factors can be considered in the evaluation at 702, such as current data center conditions 304 and/or forecasted demand 306, as discussed herein. For example, a forecast of the workload/demand on the cloud storage platform 102 can be considered as an additional factor at 702. Forecasted demand can be based on any suitable forecasting approach or model, as described herein.

At 704, based on the evaluation at 702, a determination is made as to whether the total SLA penalty can be reduced. If it is determined at 704 that the total SLA penalty can be reduced (e.g., moving the storage allocation 126 to a new storage location 300 and/or changing the amount of storage 126 allocated is estimated to reduce the total SLA penalty), the process 700 can follow the "yes" route to 706 where the existing/current storage allocation 126 is adapted in a new storage allocation to reduce, or minimize, the total SLA penalty. The adaptation of the storage allocation 126 at 706 can include determining a new storage location 300 among a set of candidate storage locations 300 and a new amount of storage 126 to allocate for the VM 116. In some configurations, the storage location 300 and/or amount of storage 126 are chosen to be those that minimize the total SLA penalty in the sense that an optimal storage location 300 and/or amount of storage 126 can be chosen that minimizes the total SLA penalty, even if there are multiple candidate storage locations 300 and/or amounts of storage 126 that are estimated to reduce the total SLA penalty. The adaptation of the storage allocation 126 at 706 can further include other types of storage adaptation operations including, without limitation, moving the VM 116 to a different host server 108, partitioning storage, consolidating storage, de-duplicating data, utilizing RDMA, migrating data from overloaded nodes to under loaded nodes, and so on. The process 700 can iterate from 706 to 702 to make a further evaluation at a subsequent time step to continually optimize storage allocations to reduce, or minimize, the total SLA penalty. Furthermore, output of the determination at 704 and/or the SLA penalty after the adaptation of the storage allocation 126 at 706 can be fed back to the cloud storage platform 102 to make adjustments (e.g., expand or scale down resources of the cloud storage platform 102) to calibrate the system to better meet a goal (e.g., excess resources of the cloud storage platform 102 below a particular amount, a total SLA penalty below a particular level, etc.).

If it is determined at 704 that the total SLA penalty cannot be reduced (e.g., moving the storage allocation 126 to a different storage location 300 and/or changing (decreasing or increasing) the amount of storage 126 allocated will not reduce the total SLA penalty), the process 700 follows the "no" route to 708 where the storage management module 130 performs a cost-benefit analysis to determine the extent to which resources are to be scaled down in the cloud storage platform 102. For example, resources can be either scaled down or reduced to by a first amount (e.g., number of resources, capacity of resources, etc.) that maintains a total SLA penalty of zero or otherwise does not increase the total SLA penalty (i.e., removing excess resources while still meeting the SLAs 200), or scaled down or reduced by a second amount that produces a positive SLA penalty when the total SLA penalty is zero or that otherwise increases the total SLA penalty, but where the benefits (e.g., providing immediate storage for a high paying customer) still outweigh the costs of scaling down the resources. The output following the "no" routes from 704 can be fed back to the cloud storage platform 102 to make adjustments (e.g., expand resources of the cloud storage platform 102) in order to reduce or eliminate the SLA penalty to avoid similar determinations in the future.

In some configurations, a determination can be made, in the context of running the cost-benefit analysis at 708, as to whether the total SLA penalty is zero, meaning that the cloud storage platform 102 is meeting the provisioned SLAs 200, or whether the total SLA penalty is positive (i.e., not zero), meaning that the cloud storage platform 102 is not meeting the provisioned SLAs 200.

Furthermore, a determination can be made as to whether the cost of providing the resources to meet the SLAs 200 is too high (e.g., above a threshold cost). For example, in some cases, it can be more profitable for the cloud storage platform 102 to incur an SLA penalty than to overspend on resources to avoid incurring an SLA penalty.

At 710, based on a result of the cost-benefit analysis at 708, resources of the cloud storage platform 102 can be scaled down, or reduced, to a particular extent, such as a first amount that does not increase the total SLA penalty or a second amount that increases the total SLA penalty. For example, an amount of resources that removes some or all of the excess resources while maintaining a total SLA penalty of zero can be eliminated at 710, or a different amount of resources can be eliminated at 710 to produce a positive total SLA penalty, or otherwise increase the total SLA penalty where it is beneficial to the cloud storage platform 102 in terms of overall cost reduction to do so.

The process 700 can iterate from 714 back to 702 where the evaluation at 702 can be repeated for a subsequent time step.

FIG. 8 is an example computing device 800 architecture for implementing the techniques described herein. For example, the computing device 800 can comprise a server computer configured to implement the techniques described herein.

The computing device 800 is shown as being equipped with one or more processors 802 and one or more forms of computer-readable memory 804. The processor(s) 802 can be configured to execute instructions, applications, or programs stored in the memory 804. In some configurations, the processor(s) 802 can include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof. The computing device 800 can include additional storage devices, such as removable storage 806 and non-removable storage 808.

Computer-readable media can include two types of computer-readable media, namely computer storage media and communication media. The memory 804, removable storage 806, and non-removable storage 808 are all examples of computer storage media. Computer storage media can include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), DVD, or other optical storage, magnetic cassettes, magnetic tape, magnetic disk storage or other magnetic storage devices, or any other non-transmission medium that can be used to store the desired information and which can be accessed by the processor(s) 802. Any such computer storage media can be part of the computing device 800. In general, computer storage media can include computer-executable instructions that, when executed by the processor(s) 802, perform various functions and/or operations described herein.

In contrast, communication media embody computer-readable instructions, data structures, program modules, or other data in a modulated data signal, such as a carrier wave, or other transmission mechanism. As defined herein, computer storage media does not include communication media.

The computer-readable memory 804 can include one or more program modules 810 or application programs, and program data 812 accessible to the processor(s) 802. The program modules 810 and the program data 812 can include one or more of the modules or data discussed with reference to the previous figures, including the example modules and data discussed with reference to FIG. 1.

The computing device 800 can further comprise input device(s) 814 such as a keyboard, pointing devices (e.g., mouse, touch pad, joystick, etc.), and so on. The computing device 800 can further include output device(s) 816, such as a display, speakers, a printer, and so on.

The computing device 800 can operate in a networked environment and, as such, the computing device 800 can further include communication connections 818 that allow the device to communicate with other computing devices 820, such as over a network. The communication connections 818 are usable to transmit messages and/or data over any suitable type of network, including wired and/or wireless networks.

The environment and individual elements described herein can of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE ONE

A computer-implemented method comprising: receiving a request for a storage service level agreement (SLA) that specifies one or more storage performance parameters; determining, for a virtual machine (VM) and based at least in part on the one or more storage performance parameters in the storage SLA: a storage location among a set of candidate storage locations; and an amount of storage to allocate; and allocating the amount of storage at the storage location for the VM to use in making storage requests.

EXAMPLE TWO

The computer-implemented method of Example One, wherein determining the storage location based at least in part on the one or more storage performance parameters in the storage SLA comprises determining the storage location by referencing a mapping between storage locations and SLA storage performance parameters.

EXAMPLE THREE

The computer-implemented method of any of the previous examples, alone or in combination, further comprising: receiving a first storage request from the VM and a second storage request from another VM; and scheduling the first storage request and the second storage request in terms of an order of sending or receiving the first and the second storage requests and respective times when the first and the second storage requests are to be sent or received, the scheduling being based at least in part on the storage SLA associated with the first storage request and another storage SLA associated with the second storage request.

EXAMPLE FOUR

The computer-implemented method of any of the previous examples, alone or in combination, wherein the one or more performance parameters in the storage SLA comprise a latency parameter that defines a maximum latency for an individual storage request to complete.

EXAMPLE FIVE

The computer-implemented method of any of the previous examples, alone or in combination, wherein the one or more performance parameters in the storage SLA comprise an object size parameter that defines a maximum size of an object for an individual storage request.

EXAMPLE SIX

The computer-implemented method of any of the previous examples, alone or in combination, wherein the one or more performance parameters in the storage SLA comprise an input/output (I/O) operations parameter that defines a minimum number of I/O operations per second.

EXAMPLE SEVEN

The computer-implemented method of any of the previous examples, alone or in combination, wherein the one or more performance parameters in the storage SLA comprise a throughput parameter that defines a minimum bitrate for an individual storage request.

EXAMPLE EIGHT

The computer-implemented method of any of the previous examples, alone or in combination, wherein the storage SLA further specifies one or more temporal components including a first peak time associated with a first storage performance parameter and a second peak time associated with a second storage performance parameter.

EXAMPLE NINE

The computer-implemented method of any of the previous examples, alone or in combination, wherein: the storage requests comprise read requests and write requests; and the storage SLA specifies: a first latency parameter that defines a first maximum latency for an individual read request to complete; and a second latency parameter that defines a second maximum latency for an individual write request to complete, wherein the second maximum latency is different than the first maximum latency.

EXAMPLE TEN

A system comprising: one or more processors (e.g., central processing units (CPUs), field programmable gate array (FPGAs), complex programmable logic devices (CPLDs), application specific integrated circuits (ASICs), system-on-chips (SoCs), etc.); and memory (e.g., RAM, ROM, EEPROM, flash memory, etc.) storing computer-executable instructions that, when executed by the one or more processors, cause the one or more processors to perform operations comprising: receiving a request for a storage service level agreement (SLA) that specifies one or more storage performance parameters; determining, for a virtual machine (VM) and based at least in part on the one or more storage performance parameters in the storage SLA: a storage location among a set of candidate storage locations; and an amount of storage to allocate; and allocating the amount of storage at the storage location for the VM to use in making read requests and write requests.

EXAMPLE ELEVEN

The system of Example Ten, the operations further comprising, prior to receiving the request for the storage SLA, outputting an interface providing storage SLA choices for selection, the storage SLA choices including the storage SLA that specifies the one or more storage performance parameters.

EXAMPLE TWELVE

The system of any of the previous examples, alone or in combination, the operations further comprising: receiving a storage request from the VM; and scheduling the storage request based at least in part on the storage SLA.

EXAMPLE THIRTEEN

The system of any of the previous examples, alone or in combination, wherein scheduling the storage request based at least in part on the storage SLA comprises: associating the storage request with the storage SLA; and placing the storage request in a queue in order to meet an input/output (I/O) operations parameter specified in the storage SLA.

EXAMPLE FOURTEEN

The system of any of the previous examples, alone or in combination, wherein scheduling the storage request based at least in part on the storage SLA comprises: associating the storage request with the storage SLA; and placing the storage request in an inbound queue among multiple inbound queues associated with respective storage performance parameter value ranges.

EXAMPLE FIFTEEN

The system of any of the previous examples, alone or in combination, wherein the respective storage performance parameter value ranges comprise respective ranges of latency values.

EXAMPLE SIXTEEN

One or more computer-readable storage media (e.g., RAM, ROM, EEPROM, flash memory, etc.) storing computer-executable instructions that, when executed by a processor (e.g., central processing unit (CPU), a field programmable gate array (FPGA), a complex programmable logic device (CPLD), an application specific integrated circuit (ASIC), a system-on-chip (SoC), etc.), perform operations comprising: receiving a request for a storage service level agreement (SLA) that specifies one or more storage performance parameters; determining, for a virtual machine (VM)

and based at least in part on the one or more storage performance parameters in the storage SLA: a storage location among a set of candidate storage locations; and an amount of storage to allocate; and allocating the amount of storage at the storage location for the VM to use in making read requests and write requests.

EXAMPLE SEVENTEEN

The one or more computer-readable storage media of Example Sixteen, the operations further comprising: evaluating the amount of storage allocated at the storage location for the VM based on a total SLA penalty for a plurality of tenants of a distributed multi-tenancy system; determining, in order to reduce the total SLA penalty: a new storage location among a current set of candidate storage locations; and a new amount of storage to allocate; and allocating the new amount of storage at the new storage location for the VM to use in making the read requests and the write requests.

EXAMPLE EIGHTEEN

The one or more computer-readable storage media of any of the previous examples, alone or in combination, the operations further comprising: evaluating the amount of storage allocated at the storage location for the VM based on a total SLA penalty for a plurality of tenants of a distributed multi-tenancy system; performing a cost-benefit analysis to determine an extent to which resources of the distributed multi-tenancy system are to be reduced; determining, based on the cost-benefit analysis, that the resources are to be reduced by a first amount that does not increase the total SLA penalty or a second amount that increases the total SLA penalty; and reducing the resources by the first amount or the second amount.

EXAMPLE NINETEEN

The one or more computer-readable storage media of any of the previous examples, alone or in combination, wherein the one or more performance parameters in the storage SLA comprise a latency parameter that defines a maximum latency for an individual read request to complete or an individual write request to complete.

EXAMPLE TWENTY

The one or more computer-readable storage media of any of the previous examples, alone or in combination, wherein the storage SLA specifies: a first latency parameter that defines a first maximum latency for an individual read request to complete; and a second latency parameter that defines a second maximum latency for an individual write request to complete, wherein the second maximum latency is different than the first maximum latency.

EXAMPLE TWENTY-ONE

A system comprising: means for executing computer-executable instructions (e.g., central processing unit (CPU), a field programmable gate array (FPGA), a complex programmable logic device (CPLD), an application specific integrated circuit (ASIC), a system-on-chip (SoC), etc.); and means for storing (e.g., RAM, ROM, EEPROM, flash memory, etc.) instructions that, when executed by the means for executing computer-executable instructions, perform operations comprising: receiving a request for a storage service level agreement (SLA) that specifies one or more storage performance parameters; determining, for a virtual machine (VM) and based at least in part on the one or more storage performance parameters in the storage SLA: a storage location among a set of candidate storage locations; and an amount of storage to allocate; and allocating the amount of storage at the storage location for the VM to use in making read requests and write requests.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A computer-implemented method comprising:
receiving, from a user device, a request for storage allocation that meets a storage service level agreement (SLA), wherein the storage SLA specifies one or more storage performance parameters including object size and time latency;
determining, for a virtual machine (VM) and based at least in part on the one or more storage performance parameters in the storage SLA:
a storage location among a set of candidate storage locations that meets the storage performance parameters; and
an amount of storage to allocate;
allocating the amount of storage at the storage location for the VM to use in satisfying storage requests;
receiving a storage request to perform a storage operation, the storage request associated with the storage SLA;
storing the storage request in a queue of queues, the queues for storing storage requests associated with SLAs with respective different object sizes and time latencies; and
retrieving the storage request from the queue and performing the storage operation at the storage location.
2. The computer-implemented method of claim 1, wherein determining the storage location based at least in part on the one or more storage performance parameters in the storage SLA comprises determining the storage location by referencing a mapping between storage locations and SLA storage performance parameters.
3. The computer-implemented method of claim 1, further comprising:
receiving a first storage request from the VM and a second storage request from another VM; and
scheduling the first storage request and the second storage request in terms of an order of sending or receiving the first and the second storage requests and respective times when the first and the second storage requests are to be sent or received, the scheduling being based at least in part on the storage SLA associated with the first storage request and another storage SLA associated with the second storage request.
4. The computer-implemented method of claim 1, wherein the one or more performance parameters in the storage SLA comprise a time latency parameter that defines a maximum time latency for an individual storage request to complete and a latency guarantee that defines an amount of storage operations that are guaranteed to be completed within a time defined by the time latency parameter.

5. The computer-implemented method of claim 1, wherein the object size parameter defines a maximum size of an object for an individual storage request.

6. The computer-implemented method of claim 1, wherein the one or more performance parameters in the storage SLA comprise an input/output (I/O) operations parameter that defines a minimum number of I/O operations per second.

7. The computer-implemented method of claim 1, wherein the one or more performance parameters in the storage SLA comprise a throughput parameter that defines a minimum bitrate for an individual storage request.

8. The computer-implemented method of claim 1, wherein the storage SLA further specifies one or more temporal components including a first peak time associated with a first storage performance parameter and a second peak time associated with a second storage performance parameter.

9. The computer-implemented method of claim 1, wherein:
the storage requests comprise read requests and write requests; and
the storage SLA specifies:
a first time latency parameter that defines a first maximum time latency for an individual read request to complete; and
a second time latency parameter that defines a second maximum time latency for an individual write request to complete, wherein the second maximum time latency is different than the first maximum time latency.

10. A system comprising:
one or more processors; and
memory storing computer-executable instructions that, when executed by the one or more processors, cause the one or more processors to perform operations comprising:
receiving, from a user device, a request for storage allocation that meets a storage service level agreement (SLA), wherein the storage SLA specifies one or more storage performance parameters including object size and time latency;
determining, for a virtual machine (VM) and based at least in part on the one or more storage performance parameters in the storage SLA:
a storage location among a set of candidate storage locations that meets the storage performance parameters; and
an amount of storage to allocate;
allocating the amount of storage at the storage location for the VM to use in satisfying read requests and write requests;
receiving a storage request to perform a storage operation;
associating the storage request with the storage SLA;
storing the storage request in a queue of queues, the queues for storing storage requests associated with storage SLAs with respective different object sizes and time latencies; and
retrieving the storage request from the queue and performing the storage operation at the storage location.

11. The system of claim 10, the operations further comprising, prior to receiving the request for the storage SLA, outputting an interface providing storage SLA choices for selection, the storage SLA choices including the storage SLA that specifies the one or more storage performance parameters.

12. The system of claim 10, the operations further comprising:
receiving the storage request from the VM; and
scheduling the storage request based at least in part on the storage SLA.

13. The system of claim 12, wherein scheduling the storage request based at least in part on the storage SLA comprises:
placing the storage request in a queue in order to meet an input/output (I/O) operations parameter specified in the storage SLA.

14. The system of claim 12, wherein scheduling the storage request based at least in part on the storage SLA comprises:
placing the storage request in an inbound queue among multiple inbound queues associated with respective storage performance parameter value ranges.

15. The system of claim 14, wherein the respective storage performance parameter value ranges comprise respective ranges of time latency values.

16. One or more computer-readable storage media storing instructions that, when executed by one or more processors, perform operations comprising:
receiving, from a user device, a request for storage allocation that meets a storage service level agreement (SLA), wherein the storage SLA specifies one or more storage performance parameters including object size and time latency;
determining, for a virtual machine (VM) and based at least in part on the one or more storage performance parameters in the storage SLA:
a storage location among a set of candidate storage locations that meets the storage performance parameters; and
an amount of storage to allocate;
allocating the amount of storage at the storage location for the VM to use in making read requests and write requests;
receiving a storage request to perform a storage operation;
associating the storage request with the storage SLA;
storing the storage request in a queue of queues, the queues for storing storage requests associated with storage SLAs with respective different object sizes and time latencies; and
retrieving the storage request from the queue and performing the storage operation at the storage location.

17. The computer-readable storage media of claim 16, the operations further comprising:
evaluating the amount of storage allocated at the storage location for the VM based on a total SLA penalty for a plurality of tenants of a distributed multi-tenancy system;
determining, in order to reduce the total SLA penalty:
a new storage location among a current set of candidate storage locations; and
a new amount of storage to allocate; and
allocating the new amount of storage at the new storage location for the VM to use in making the read requests and the write requests.

18. The computer-readable storage media of claim 16, the operations further comprising:
evaluating the amount of storage allocated at the storage location for the VM based on a total SLA penalty for a plurality of tenants of a distributed multi-tenancy system;

performing a cost-benefit analysis to determine an extent to which resources of the distributed multi-tenancy system are to be reduced;

determining, based on the cost-benefit analysis, that the resources are to be reduced by a first amount that does not increase the total SLA penalty or a second amount that increases the total SLA penalty; and reducing the resources by the first amount or the second amount.

19. The computer-readable storage media of claim 16, wherein the time latency parameter defines a maximum time latency for an individual read request to complete or an individual write request to complete.

20. The computer-readable storage media of claim 16, wherein the storage SLA specifies:
   a first time latency parameter that defines a first maximum time latency for an individual read request to complete; and
   a second time latency parameter that defines a second maximum time latency for an individual write request to complete, wherein the second maximum time latency is different than the first maximum time latency.

* * * * *